US007689899B2

(12) United States Patent
Leymaster et al.

(10) Patent No.: US 7,689,899 B2
(45) Date of Patent: Mar. 30, 2010

(54) METHODS AND SYSTEMS FOR GENERATING DOCUMENTS

(75) Inventors: Mark Hendricks Leymaster, Silver Spring, MD (US); Preston Holliday Abbott, Guilford, CT (US); Christopher D. Crisci, Cos Cob, CT (US); Seshadri Venkata Krishna, Bangalore (IN); Shriram Narayanan, Stamford, CT (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 757 days.

(21) Appl. No.: 10/092,101

(22) Filed: Mar. 6, 2002

(65) Prior Publication Data

US 2003/0172343 A1    Sep. 11, 2003

(51) Int. Cl.
*G06F 17/00* (2006.01)
(52) U.S. Cl. .......................... 715/224; 705/17; 705/44; 706/46
(58) Field of Classification Search .................. 707/1; 705/35, 38; 715/530, 506–508, 526, 500, 715/219, 230, 273
See application file for complete search history.

(56) References Cited

U.S. PATENT DOCUMENTS

| | | | |
|---|---|---|---|
| 4,663,615 A | 5/1987 | Hernandez et al. | |
| 4,831,526 A | 5/1989 | Luchs et al. | |
| 4,962,475 A | 10/1990 | Hernandez et al. | |
| 5,043,891 A | 8/1991 | Goldstein et al. | |
| 5,144,555 A | 9/1992 | Takadachi et al. | |
| 5,228,121 A | 7/1993 | Fontaine et al. | |
| 5,267,155 A | 11/1993 | Buchanan et al. | |
| 5,272,623 A | 12/1993 | Grubb et al. | |
| 5,434,962 A | 7/1995 | Kyojima et al. | |
| 5,446,653 A | 8/1995 | Miller et al. | |
| 5,511,193 A | 4/1996 | Tung et al. | |
| 5,630,126 A | 5/1997 | Redpath | |
| 5,634,019 A | 5/1997 | Koppolu et al. | |
| 5,634,054 A | 5/1997 | Sarachan | |
| 5,655,130 A | 8/1997 | Dodge et al. | |
| 5,659,676 A | 8/1997 | Redpath | |
| 5,669,005 A | 9/1997 | Curbow et al. | |
| 5,671,429 A | 9/1997 | Tanaka | |
| 5,692,206 A | 11/1997 | Shirley et al. | |
| 5,740,455 A | 4/1998 | Pavley et al. | |
| 5,742,816 A | 4/1998 | Barr et al. | |
| 5,819,302 A | 10/1998 | Nielsen | |
| 5,953,718 A | 9/1999 | Wical | |
| 6,014,680 A | 1/2000 | Sato et al. | |
| 6,061,698 A | 5/2000 | Chadha et al. | |
| 6,072,461 A | 6/2000 | Haran | |
| 6,182,095 B1 | 1/2001 | Leymaster et al. | |
| 6,209,004 B1 | 3/2001 | Taylor | |
| 6,243,740 B1 | 6/2001 | Minneman et al. | |
| 6,272,485 B1 * | 8/2001 | Sragner ........................ 707/1 |
| 6,307,962 B1 | 10/2001 | Parker et al. | |

(Continued)

*Primary Examiner*—Doug Hutton
*Assistant Examiner*—Quoc A Tran
(74) *Attorney, Agent, or Firm*—Armstrong Teasdale LLP

(57) ABSTRACT

A document assembly production system including a server and at least one remote computer is provided. The server has a plurality of templates and other document assembly assets stored therein. The remote computer is configured to communicate with the server to access the plurality of templates and the other assembly assets to assemble fully formatted documents without using any document-assembly software and word processing software stored on the remote computer.

25 Claims, 23 Drawing Sheets

U.S. PATENT DOCUMENTS

| | | | |
|---|---|---|---|
| 6,446,048 B1 * | 9/2002 | Wells et al. | 705/35 |
| 6,601,057 B1 * | 7/2003 | Underwood et al. | 707/1 |
| 2001/0047326 A1 * | 11/2001 | Broadbent et al. | 705/38 |
| 2002/0046235 A1 * | 4/2002 | Foy et al. | 709/203 |
| 2002/0178190 A1 * | 11/2002 | Pope et al. | 707/530 |
| 2007/0208606 A1 * | 9/2007 | Mackay et al. | 705/9 |

* cited by examiner

Deal Generator
Unanswered Questions Report — 882
Deal ID: 807 Structure: 188

| | | |
|---|---|---|
| Deal Description | A Top Polymers MHL Test 1-10-02 — 888 | |
| Created by | Appuser1 | Modified by Appuser1 — 892 |
| Creation Date | 1/10/02 | Modified Date — 896 1/10/02 |

Unanswered Deal Information Questions:

| S.No | Question ID: | | Instance# |
|---|---|---|---|
| 1 | 428 | Enter the name of the STATE where Leading Borrower is Chartered: | 0 |
| 2 | 430 | Choose the LEGAL ENTITY as which the Leading Borrower is Chartered: | 0 |
| 3 | 429 | Enter the full name of the STATE where the Second Borrower is Chartered: | 0 |
| 4 | 431 | Choose the LEGAL ENTITY Type as which the Second Borrower is Chartered: | 0 |
| 5 | 619 | Enter the Account CAPTION for this Deal, prefixed for the words "Account Manager" to create the Title of the person receiving Notices under the Loan and Security Agreement: | 0 |
| 6 | 591 | Enter the Maximum REVOLVING LOAN Amount for Both Borrowers combined, in Dollars: | 0 |
| 7 | 10 | Enter the REVOLVING Loan DURATION, in years: | 0 |
| 8 | 11 | Enter the REVOLVING Loan Rate MARGIN (just the INCREMENT, excluding the index Rate bas | 0 |

FIG. 16

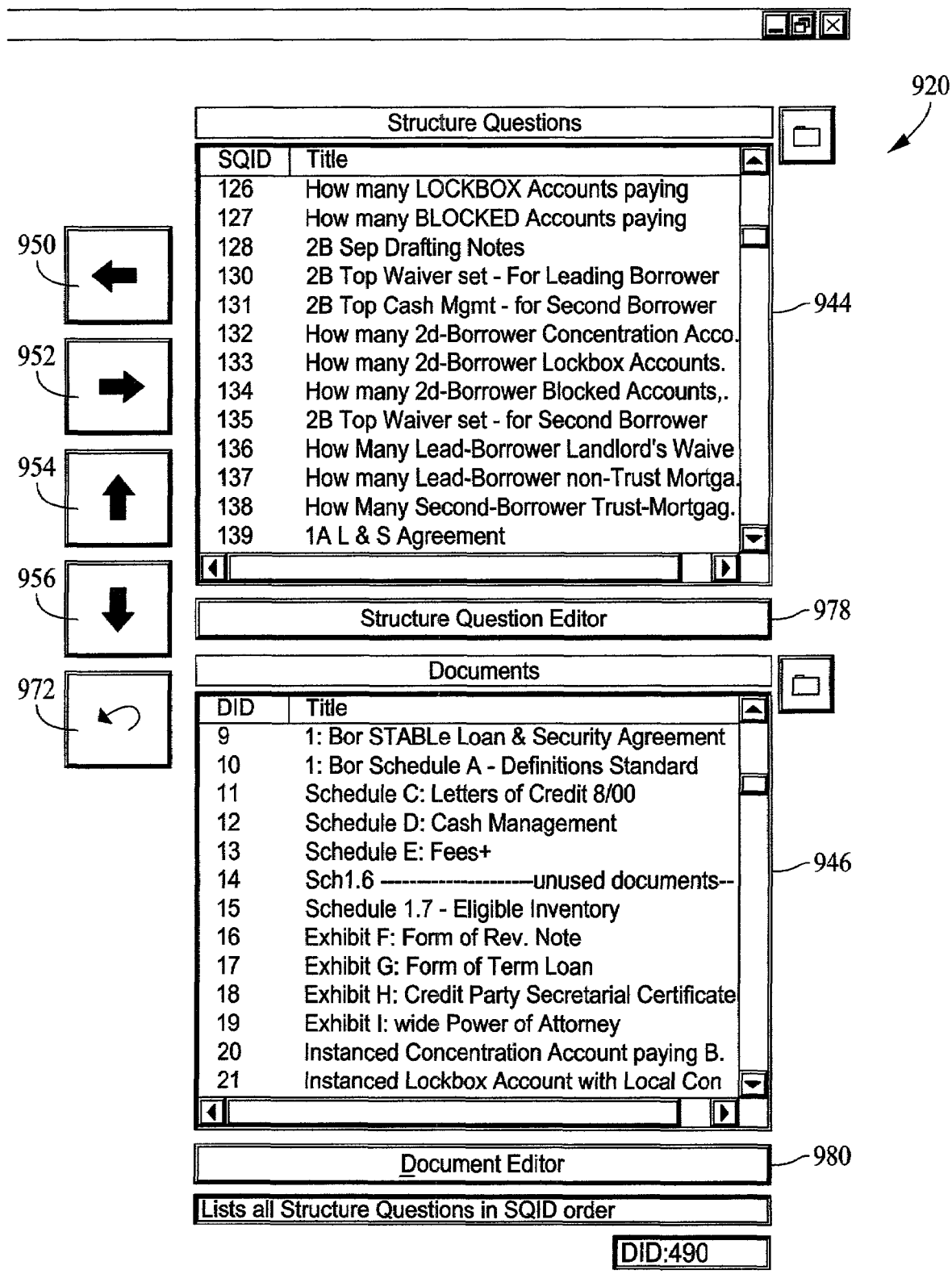

FIG. 20B →

Application Questions

| IQID | Title |
|---|---|
| 9 | REVOLVING LOAN Amount, in Dollars: |
| 10 | REVOLVING Loan DURATION, in years. |
| 11 | REVOLVING Loan Rate MARGIN Increment |
| 20 | Full LEGAL NAME of the Borrower: |
| 24 | LETTER of CREDIT SUBFACILITY amount,.. |
| 25 | ADVANCE RATE on Borrowers Eligible ACC... |
| 26 | SUBLIMIT value for All Eligible INVENTORY... |
| 27 | ADVANCE RATE of Eligible TYPE-A INVEN... |
| 28 | DESCRIPTION of INVENTORY TYPE-A: |
| 31 | ADVANCE RATE of Eligible TYPE-B INVEN... |
| 32 | DESCRIPTION of INVENTORY TYPE-B: |
| 34 | number of Business Days for Collection: |
| 35 | PRINCIPAL Amount of the Original TERM L... |
| 36 | DURATION of the TERM LOAN, in years: |
| 37 | Regular Monthly Payment in Term Amortization |
| 38 | TERM Loan Rate MARGIN (i.e,just the INC... |
| 39 | Closing Fee, in Dollars: |
| 40 | Annual COLLATERAL MONITORING FEE, I... |
| 41 | UNUSED LINE FEE Rate, in Percent: |
| 42 | LETTER OF CREDIT FEE Rate, in Percent: |
| 43 | PREPAYMENT FEE Rate during the first ye... |
| 45 | PREPAYMENT FEE Rate during the second... |
| 47 | PREPAYMENT FEE Rate during the third ye... |
| 49 | DEADLINE for Revolving Credit ADVANCE r... |
| 51 | CITY Name for interpreting the time in the Re... |
| 52 | a summary DESCRIPTION of the permitted u... |
| 53 | in WORDS the REVOLVING Loan Rate MA... |
| 55 | in WORDS the TERM Loan Rate MARGIN (... |
| 57 | LEGAL NAME of PRIOR LENDER(s), who... |
| 58 | LEGAL NAME of PRIOR LIEN-HOLDER(s),... |
| 59 | amount of Initial NET BORROWING AVAILA... |
| 60 | MAXIMUM amount of DEBT apart from this... |
| 61 | full name of STATE whose LAWS GOVERN... |
| 62 | full name of STATE or FEDERAL DISTRICT... |

Application Question Editor — 1102    IQID:

Defines Document and Information Question Structure

METHODS AND SYSTEMS FOR GENERATING DOCUMENTS

BACKGROUND OF THE INVENTION

This invention relates generally to document generation, and more specifically, to methods and systems for generating documents relating to involved transactions.

Businesses engaging in complex involved transactions, referred to herein as "deals," such as commercial financing, mergers, acquisitions and real estate transactions, generate lengthy and complex documents in order to negotiate, finalize, and document such deals. Computer software applications for text editing and document production may be used to generate these transactional deal documents. Word processing and text editing software may assist a user with the input and editing of text-based documentation. If properly prepared, at least some known word processing applications can present a blank entry form or boilerplate form into which customizing data, referred to herein as deal data, is manually entered and manually edited in a text format. Word processing applications also allow previously completed documents or document templates to be retrieved and re-edited to form new documents, one at a time.

Word processing applications are commonly used to edit and produce the documents required in business transactions. Complex business deals may require hundreds of pages of custom documents to specify the rights and obligations of the parties involved in the business deal. To acquire and maintain the expertise needed to determine the terms of such transactions, and to correctly generate, edit, and audit the complex documents accompanying each such transaction requires a significant commitment of personnel, time, and cost.

BRIEF DESCRIPTION OF THE INVENTION

In one aspect, a document assembly production system including a server and at least one remote computer is provided. The server has a plurality of templates and other document assembly assets stored therein. The remote computer is configured to communicate with the server to access the plurality of templates and the other assembly assets to assemble fully formatted documents without using any document-assembly software and word processing software stored on the remote computer.

In another aspect, a document assembly production system including a server and a remote system is provided. The server includes a processor module which generates a HTML page displaying a series of questions on the remote system relating to a desired structure of a document to be assembled.

In another aspect, a document assembly production system including a server and at least one remote computer is provided. The server is in communication with a processor module. The server is configured to generate a web page displaying a series of questions on at least one remote computer to be responded to by a user, and fill in a plurality of fill points within an incomplete assembled document stored in the server to complete an assembled document.

In another aspect, a document assembly authoring system including a server and at least one remote computer is provided. The server has a plurality of templates and other document assembly assets stored therein. The remote computer is in communication with the server. The server has an administration module for creating and managing the plurality of templates and the other document assembly assets.

In another aspect, a secure computer-based method for assembling output documents using a server coupled to a database and at least one remote computer is provided. The database has a plurality of templates stored therein. The method includes displaying document structure questions at the remote computer, where the questions displayed are controlled by logic and conditions imbedded in a user selected template, and are displayed in a tree format. The method also includes receiving a response for each question displayed, altering the displayed structure question tree based on at least one response received from a user, and generating the assembled documents based on the responses received from the user.

BRIEF DESCRIPTION OF THE DRAWINGS

FIG. 16 is an example embodiment of a user interface displaying a Reports page within a DDACS.

FIGS. 17A and 17B show an example embodiment of a user interface displaying a Structure or Template Builder page within a DDACS.

FIGS. 20A and 20B show an example embodiment of a user interface displaying a Deal Information Builder page within a DDACS.

DETAILED DESCRIPTION OF THE INVENTION

Figure 1:
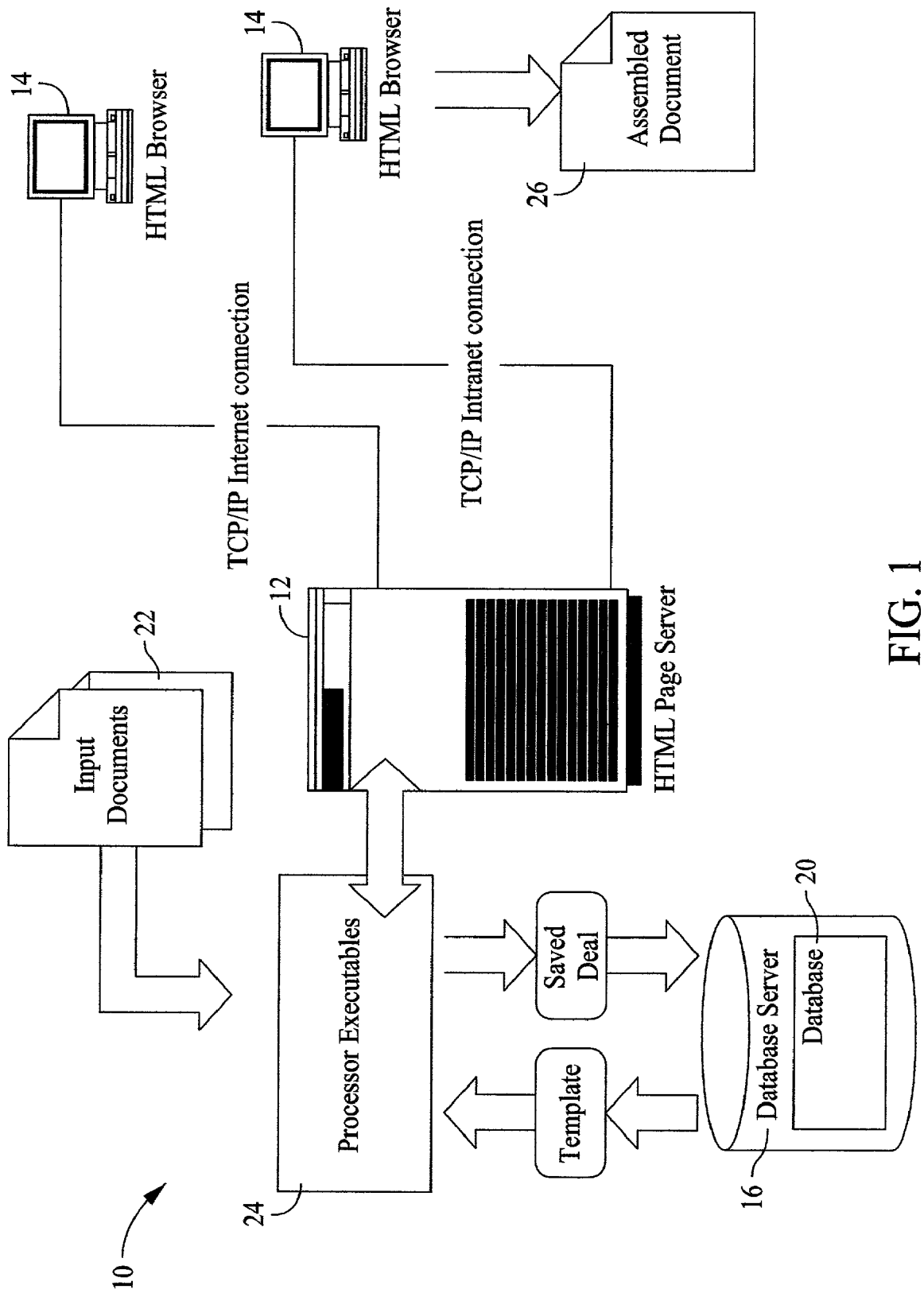
FIG. 1 is a simplified block diagram of one embodiment of a processor module of a Deal Document Assembly Coordination System (DDACS).

Example embodiments of systems and processes that facilitate integrated network-based electronic reporting, document assembly, and workflow process management related to a Deal Document Assembly Coordination System (DDACS) are described below in detail. The systems and processes facilitate, for example, electronic submission of document type and structural choices, as well as customizing information for document assembly using a remote system, automated validation of information, and HTML based reporting for internal and external system users. The DDACS permits a business entity to manage document assembly and the workflow relating to a business deal.

In the example embodiment, the DDACS is utilized to collect, track, display, and disseminate real time information, including data that relates to a deal involving a business entity relationship or "deal data." Deal data includes at least one of general business information for a business entity, a deal description or deal definition, a deal template and structure, allied deal information, assembled documents, and the parties involved in the financial transaction or deal. The DDACS prompts the users to input certain deal data, select a class of document to be assembled, and then prompts the user to select from a list of issues and matters those specific documents that are necessary for the business deal. The user is then prompted to supply specific data for the deal, such as names and dates, and after checking the data for validity and consistency, the DDACS then enables the user to assemble the output document relating to the business deal so that the deal may be negotiated and documented. In addition, the DDACS provides the user with help features, supporting detail and other advice during the generation of the deal documents that facilitate speeding the completion of the document assembly. The DDACS also provides the user with a plurality of reports regarding the deal data entered and whether additional deal data is needed.

Deal data relating to a business deal and the business entities involved in the deal is received by the DDACS and stored in a database. The DDACS updates the database with deal data received, tracks the deal data received, provides deal data to a user, generates reports relating to the business deal, and allows an attorney to review the assembled document before it is presented to the parties.

In the DDACS, deal data is stored in the database. The network based DDACS provides convenient access to deal data, including at least one of a deal type, a business group involved with the deal, a regional location of the business unit, a deal workflow stage, a deal completion status, a type of document to assemble, a person that created the selected deal entry, a person that last edited the selected deal entry, deal description text, selected deal input documents, and the customer involved in the deal. In the example embodiment, users are authorized by the DDACS administrator to gain access into the DDACS, and each user logs onto DDACS using a local HTML browser. Once the DDACS home page is accessed, the user may choose from a list of saved deals or customer names that the user has been given to manage or enter deal data.

In one embodiment, a server-based computer program is provided, and the program is embodied on a computer readable medium and utilizes a Structured Query Language (SQL) database with remote client software for administration but a remote HTML browser interface for standard document assembly management, data entry, and reporting. In an example embodiment, the system is web-enabled and is executable using a business-entity intranet. The DDACS is accessible by individuals having an authorized access outside the firewall of the DDACS hosting business-entity through the Internet. The system operates in a Windows® environment (Windows is a registered trademark of Microsoft Corporation, Redmond, Wash.).

The systems and processes are not limited to the specific embodiments described herein. In addition, components of each system and each process can be practiced independently and separately from other components and processes described herein. Each component and process also can be used in combination with other assembly packages and processes.

FIG. 1 is a simplified block diagram of a processor module of Deal Document Assembly Coordination System (DDACS) 10 including a server system 12, and a plurality of remote sub-systems, also referred to as remote systems 14, connected to server system 12. In one embodiment, remote systems 14 are computers including a web browser, such that server system 12 is accessible to remote systems 14 via the Internet. Remote systems 14 are interconnected to the Internet through a plurality of interfaces including a network, such as a local area network (LAN) or a wide area network (WAN), dial-in-connections, cable modems and special high-speed ISDN lines. Remote systems 14 can be any device capable of interconnecting to an intranet or the Internet including a web-based phone, personal digital assistant (PDA), or other web-enabled connectable equipment. A database server 16 is connected to a database 20 containing information on a variety of matters, as described below in greater detail. In one embodiment, centralized database 20 is stored on server system 12 and can be accessed by potential users at one of remote systems 14 by logging onto server system 12 through one of remote systems 14. In an alternative embodiment database 20 is stored remotely from server system 12 and may be non-centralized. In the example embodiment, database 20 is an Oracle® database (Oracle is a registered trademark of Oracle Corporation, Redwood City, Calif.).

In the example embodiment, input documents 22 are used by a processor module 24 on server system 12 in conjunction with information stored on database 20. Processor module 24 also retrieves information from database 20 and input documents 22 such that information may be displayed on remote systems 14. Remote system 14 then directs the processor module 24 in the creation of assembled documents 26, also known as output documents, as the user adds, changes, and deletes information displayed on remote system 14 and stored in database 20. The assembled document 26 can be delivered to remote system 14 or directed elsewhere by the user. Assembled documents 26 relate to the business deal, sometime also referred to as the financial transaction.

In the example embodiment, each input document 22 is a native Word™ formatted file containing appropriately formatted text and graphics that may be used in a particular class of assembled documents and a template selected by the user via DDACS 10 for a particular assembled document 26. (Word is a trademark of Microsoft Corporation, Redmond, Wash.). At least some input documents 22 are several pages in length. Input documents 22 are created in a word processor, and not in DDACS 10. Input documents 22 do not have to be stored in database 20 though they must be in a designated server directory. However, as discussed below, synchronizing information relevant to each specific input document 22 is stored in database 20. If processor module 24 calls for an input document 22 that does not include corresponding synchronizing information, or alternatively, fails to locate a requested input document 22, processor module 24 "locks" the corresponding template and does not generate assembled document 26.

In the example embodiment, assembled document 26, also known as an output document, is the final document assembled by processor module 24. Assembled document 26 is a native Word™ formatted file. However, assembled document 26 may be delivered in formats other than Word™ formats. Typically, assembled document 26 is built of many input documents 22, and when complete, contains several logical documents. A logical document is a part of an assembled document 26 that is logically complete of itself, for example, an Appendix or a Reporting Form. An assembled document 26 may be comprised of many logical documents. A single logical document may be comprised of several input documents 22, while another input document 22 may contain several logical documents in the order they would appear in assembled document 26.

Figure 2:
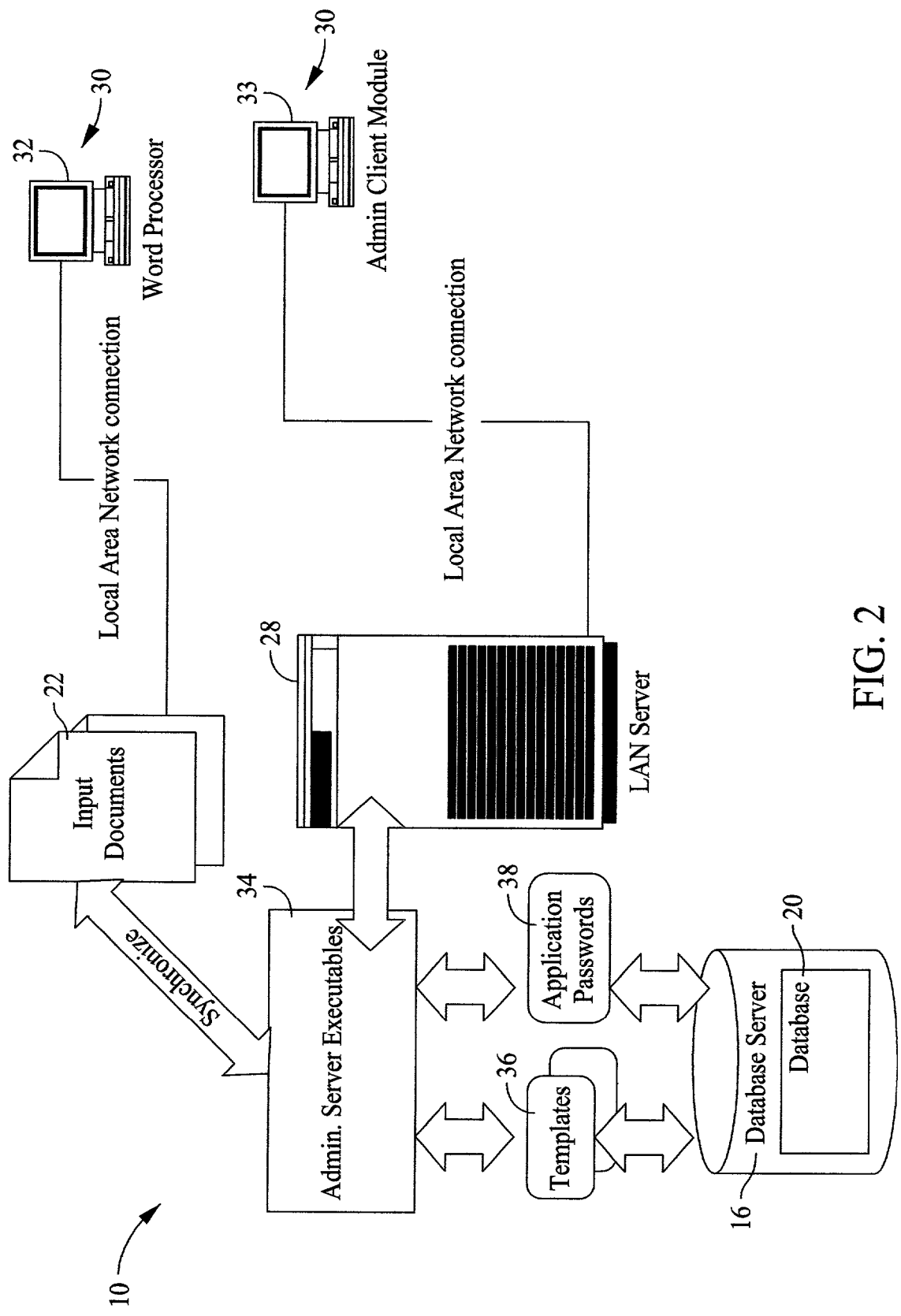
FIG. 2 is a simplified block diagram of one embodiment of an administration module of a DDACS.

FIG. 2 is a simplified block diagram showing an administration module of Deal Document Assembly Coordination System (DDACS) 10 including server system 28, and remote systems 30 connected to server system 28. In the example embodiment, remote systems 30 are computers that include a word processor system 32 and an administration client module 33. In the example embodiment, word processor system 32 and administration client module 33 are interconnected to server system 28 through a local area network (LAN). Word processor system 32 enables a user to generate input documents 22 that are made available to an administration server module 34 on server system 28 such that synchronizing information concerning input documents 22 may be stored in database 20. Administration server module 34 also retrieves information from database 20 such that information may be displayed and edited on remote systems 30 equipped with administration client module 33.

Input documents 22 are created on word processor system 32, and are synchronized with DDACS 10 through administration server module 34. Administration server module 34 determines synchronizing information about each input document 22, which information is then stored in database 20. Administration server module 34 also creates, revises, and manages templates 36 and passwords 38. If processor module 24 (shown in FIG. 1) locates an input document 22 that does not conform to its corresponding synchronizing information, or alternatively, fails to locate a requested input document 22, processor module 24 "locks" the corresponding template and does not generate assembled document 26 (shown in FIG. 1).

In the example embodiment, each template 36 is one of a potentially infinite set of control structures. Each template 36 is a highly structured set of relational database tables that contain much of the content displayed by DDACS 10, in addition to the logic that controls all visible and invisible operations from a structure interview and input document selection to insertion of data into appropriate "blanks" in assembled documents 26. Each template 36 is stored in database 20.

The term "structure" as used herein refers to an organization of a particular output document, roughly analogous to a list of logical documents that might be listed in a table of contents for that output document. As discussed below in detail, the structure is defined as a result of a user responding to questions presented on a Deal Structure interview page filtered with the business logic built into a template 36. Fill points are specially formatted "blanks" in input documents 22 which, when used in an assembled document 26, receive appropriate user-supplied data under template 36 control.

Figure 3:
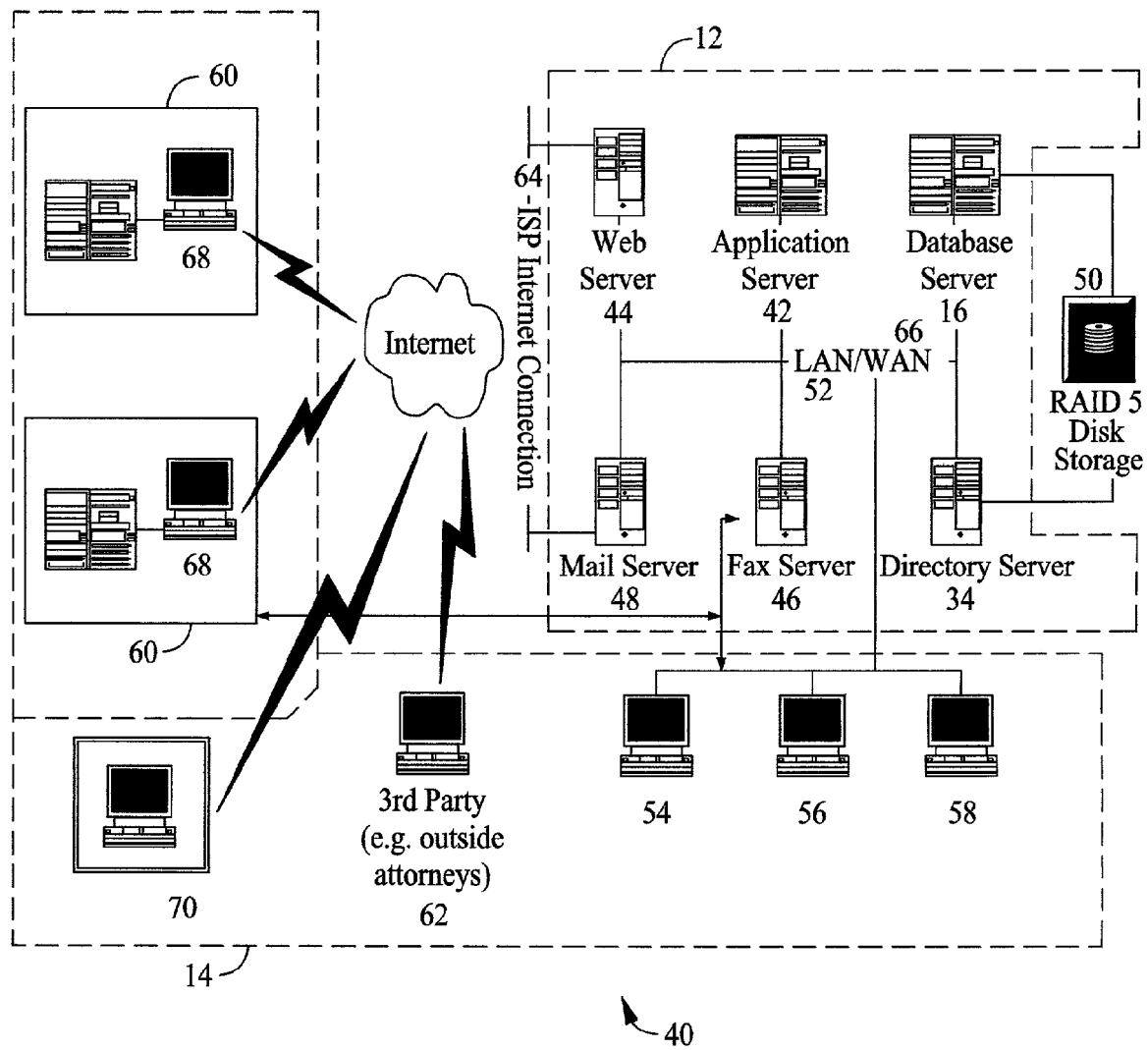
FIG. 3 is an expanded version block diagram of an example embodiment of a server architecture of the DDACS.

FIG. 3 is an expanded block diagram of an example embodiment of a server architecture of a DDACS 40. Components in system 40, identical to components of system 10 (shown in FIGS. 1 and 2), are identified in FIG. 3 using the same reference numerals as used in FIGS. 1 and 2. System 40 includes server system 12 and remote systems 14. Server system 12 further includes database server 16, an application server 42, a web server 44, a fax server 46, a directory server 34, and a mail server 48. A disk storage unit 50 is coupled to database server 16 and directory server 34. Servers 16, 34, 42, 44, 46, and 48 are coupled in a local area network (LAN) 52. In addition, a system administrator's workstation 54, a user workstation 56, and a supervisor's workstation 58 are coupled to LAN 52. Alternatively, workstations 54, 56, and 58 are coupled to LAN 52 via an Internet link or are connected through an intranet.

Each workstation, 54, 56, and 58 is a personal computer having a web browser. Although the functions performed at the workstations typically are illustrated as being performed at respective workstations 54, 56, and 58, such functions can be performed at one of many personal computers coupled to LAN 52. In the example embodiment, in order to perform DDACS administration functions, an administration client module 33 must be installed on the workstation. Workstations 54, 56, and 58 are illustrated as being associated with separate functions only to facilitate an understanding of the different types of functions that can be performed by individuals having access to LAN 52. In an example embodiment, remote system 14 could be workstation 54 which can be used by a user to assemble a document using information stored in database 20.

Server system 12 is configured to be communicatively coupled to various individuals, including employees 60 and to third parties, e.g., outside attorneys, 62 perhaps via an ISP Internet connection 64. The communication in the example embodiment is illustrated as being performed via the Internet, however, any other wide area network (WAN) 66 type communication can be utilized in other embodiments, i.e., the systems and processes are not limited to being practiced via the Internet. In addition, and rather than WAN 66, local area network 52 could be used in place of WAN 66.

In the example embodiment, any authorized individual having a workstation 68 that includes administration client module 33 (shown in FIG. 2) can access DDACS 40. One of the remote systems may include a manager workstation 70 located at a remote location. Workstations 68 and 70 are personal computers having a web browser. Also, workstations 68 and 70 are configured to communicate with server system 12. Furthermore, fax server 46 communicates with remotely located client systems, including a client system 68 via a telephone link. Fax server 46 is configured to communicate with other remote systems 54, 56, and 58 as well.

As explained above, the architecture of system 40 as well as various components of system 40 are example only. Other architectures are possible and can be utilized in connection with practicing the processes described below.

Figure 4:
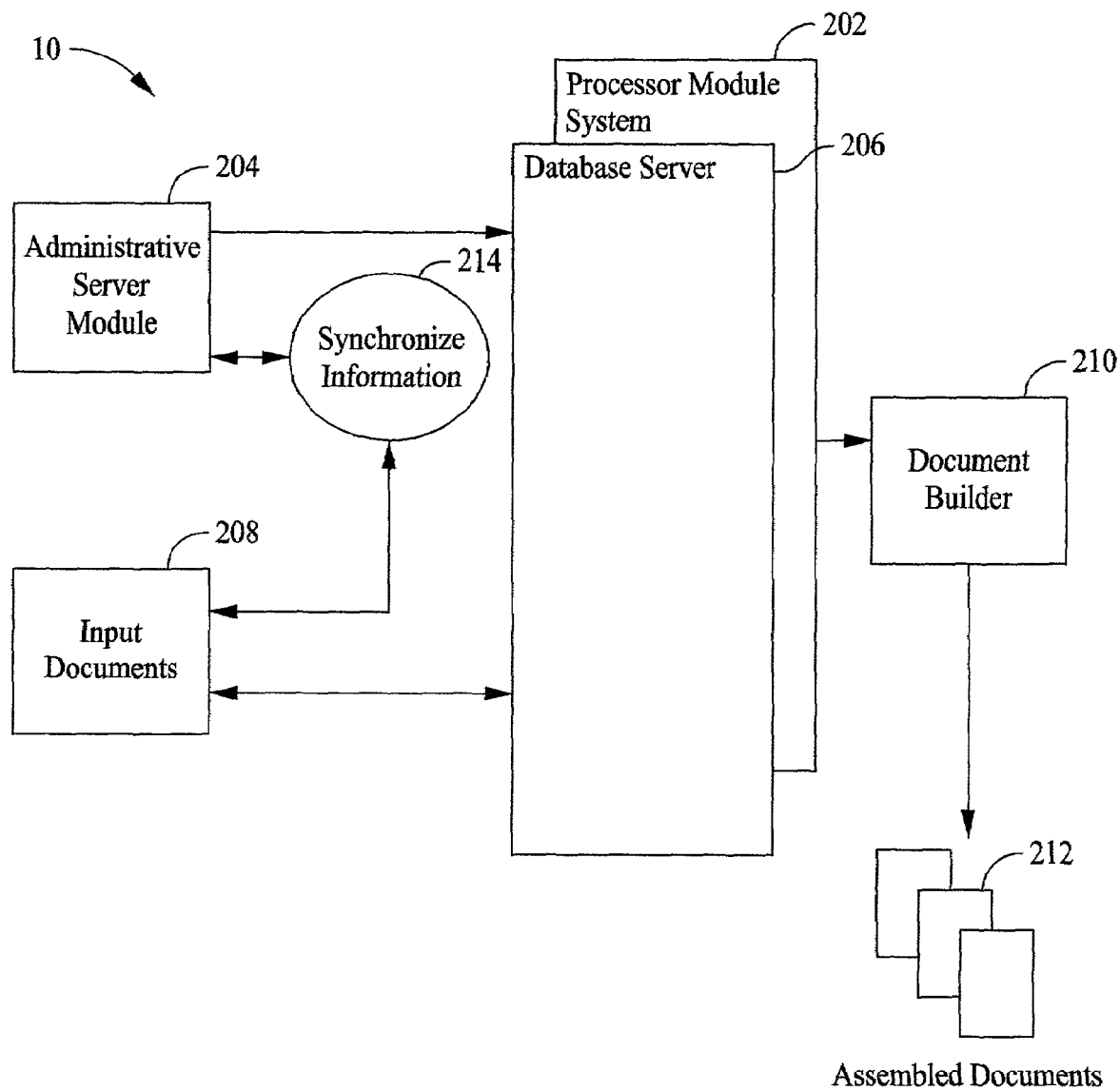
FIG. 4 is a simplified block diagram of an example embodiment of DDACS.

FIG. 4 is a simplified block diagram of Deal Document Assembly Coordination System (DDACS) 10 including processor module system 202, administration server module 204, database server 206, input documents 208, document builder 210, and assembled documents 212. In the example embodiment, administration server module 204 interoperates with processor module system 202 and database server 206. Administration server module 204 synchronizes information 214 about each input document 208 and stores synchronized information 214 on database server 206. If processor module system 202 needs an input document 208 that does not include corresponding synchronizing information 214, or alternatively, fails to locate a needed input document 208, processor module system 202 "locks" the template that corresponds with needed input document 208 and does not allow document builder 210 to generate assembled documents 212. Input documents 208 are selected for document assembly and validated by processor module system 202. Processor module system 202 communicates with document builder 210 to enable document builder 210 to generate assembled documents 212 using stored deal data.

Figure 5:
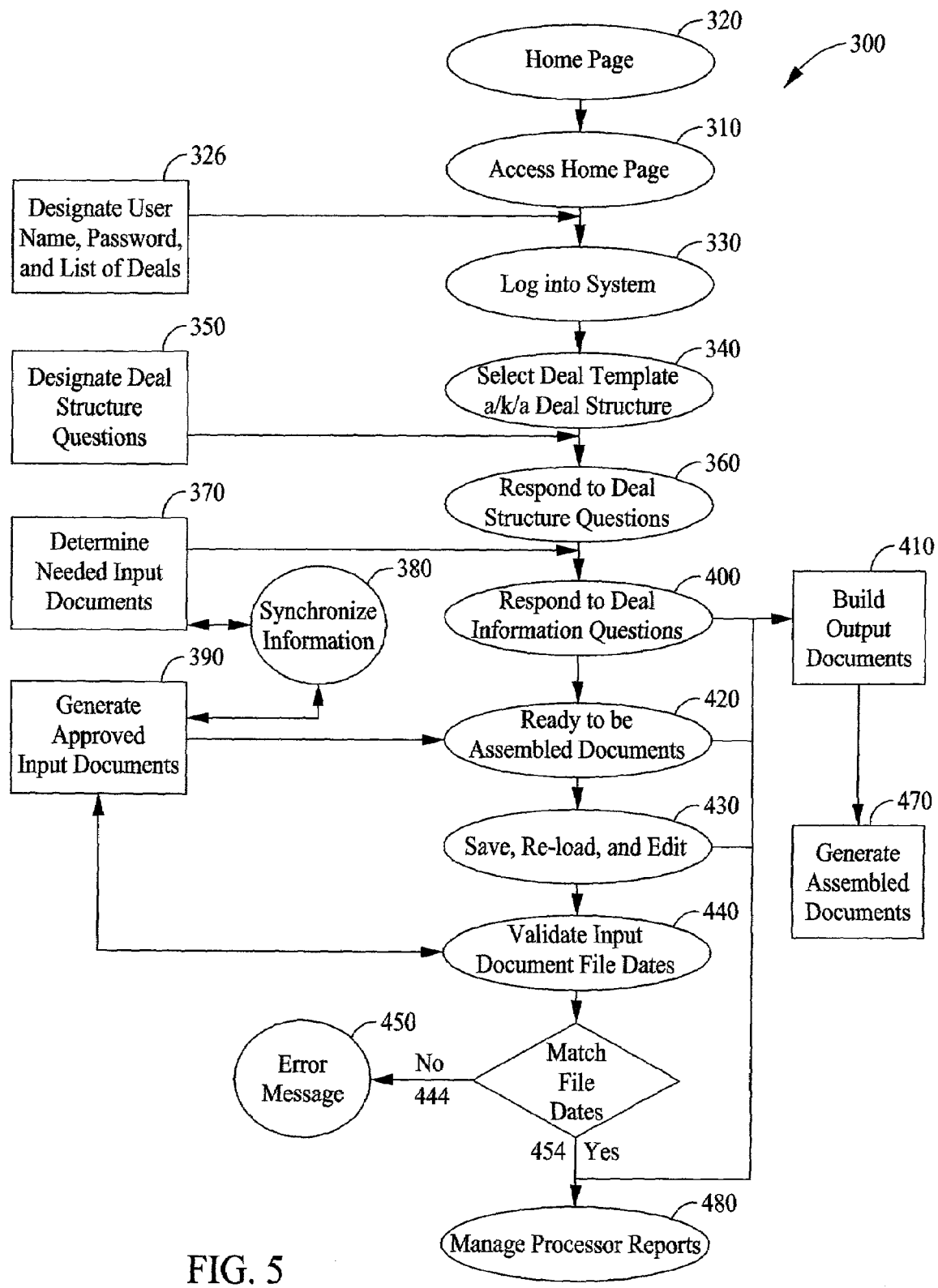
FIG. 5 is a flowchart illustrating a process for generating documents using the DDACS described in connection with FIGS. 1-4.

FIG. 5 illustrates a flowchart 300 illustrating an example processes executable by system 10 (shown in FIG. 1). Initially, a user accesses 310 a user interface, such as a home page 320, of a web site through remote system 14 (shown in FIG. 1). In one embodiment, remote system 14, server system 12 (shown in FIG. 1), administration client module 33 (shown in FIG. 2), and administration server system 28 (shown in FIG. 2) are protected from access by unauthorized individuals. In the example embodiment, prior to the user logging into system 10, a deal generator administrator utilizes administration client module 33 and administration server module 34 (shown in FIG. 2) to designate a user name, password, and at least one deal 326 for a user approved to assemble documents. The deal generator administrator designates the user name and password through administration client module 33 and administration server module 34. The user then logs-in 330 to system 10 using a password (not shown) for security.

After logging into system 10 through remote system 14, a deal definition page is displayed to the user that enables the user to select a class of document to assemble by choosing a deal template (described as a "structure" in the example embodiment) 340. The deal definition page also prompts the user to input data relating to a business group in which the deal originates, a current stage in the workflow for the deal, an approval status of the deal, and whether this is to be a new document assembly or a revision to an existing document to be assembled. Once the user selects deal template 340 by utilizing remote system 14, the deal definition page displays a list of deals that the user has been approved to manage and that correspond with the entered data (shown in FIG. 8).

After selecting deal template 340, system 10 displays a deal structure page that includes designated deal structure questions 350 that were previously entered by an administrator utilizing administration client module 33 and administration server module 34, and stored in deal template 340. The user then responds to the designated deal structure questions 360 by utilizing remote system 14 and processor module 24 (shown in FIG. 1). The deal structure page also enables the user to revise the descriptive name assigned to the deal within system 10. In particular, the deal structure page displays a tree-like list of yes-or-no questions concerning possible issues and matters that relate to the transaction. To answer "yes," the user clicks in the check box to the left of the text of the deal structure question. To answer "no," the check box is left empty. If there are related follow-up deal structure questions, the deal structure question tree expands below the parent question if it was answered "yes," and presents the subsequent deal structure questions. Questions not answered "yes" are moved away from the focused area of the question tree so the user may continue to see only the relevant structure questions. Within the question tree in the example embodiment, the relevant follow-up deal structure questions are visually identifiable because they are indented and may be color coded with respect to the parent question. If the deal structure page is repainted, the page remembers the user's place prior to the change in display, and resets the focus of the browser after the repaint to maintain the user's previous focus on the last structure question answered.

After responding to deal structure questions 360, needed input document files 370 and synchronized dates for those files 380 are determined and called by processor module 24. Previously, administration client module 33 in communication with administration server module 34 synchronized input documents, recorded synchronized date information 380 about each approved input document 390, and stored the synchronized date information in database 20 (shown in FIG. 2). The document to be assembled is then drafted by merging needed input documents 370, including all formatting and fill-points contained in those input documents, in the order directed by the selected template. System 10 then displays a deal information page that prompts the user to respond to deal information questions 400 displayed on that page. More specifically, the deal information page displays a list of questions to be responded to by the user, whose answers are used to supply the fill points in the documents to be assembled. The questions displayed on the deal information page typically require keyboard entry of words or numbers. The user may also be prompted with pull-down lists, check boxes, and radio buttons. The data entered in response to these information questions is checked for validity and consistency with range limits and other requirements before the user is permitted to proceed to the next response; the limits and data type having been established when the template was created by the administrator using administration client module 33 and administration server module 34 but no communication across the network or Internet is required for this validation. After responding to deal information questions 400, system 10 checks managed deal information through processor module 24, as described below, and if satisfactory sends data to the document builder to begin building 410 output documents.

After completing responses to specific deal information questions 400, system 10 readies the documents to be assembled 420 from the selected deal structure 340 and approved input documents 390. System 10 enables the user to save, re-load, and edit 430 the transaction documents. Before permitting a document to be assembled, system 10 validates 440 that the input documents include the appropriate date assigned thereto. If the input documents are not validated 444, the user will receive an error message 450, and the document will not be assembled. Furthermore, if input documents are validated 454, then system 10 directs document builder 410 to complete generating output documents 470. More specifically, the specially coded blanks in each input document are "filled" using a search-and-replace method, the deal information data, and the fill points managed by processor module 24 and the selected template. When the document is fully built, the generated assembled document 470 is displayed to the user for review within the browser, or for downloading. Lastly, if requested by the user via remote system 14, system 10 generates a plurality of reports 480 relating to the document assembly (e.g., a listing of unanswered deal structure questions).

Figure 6:
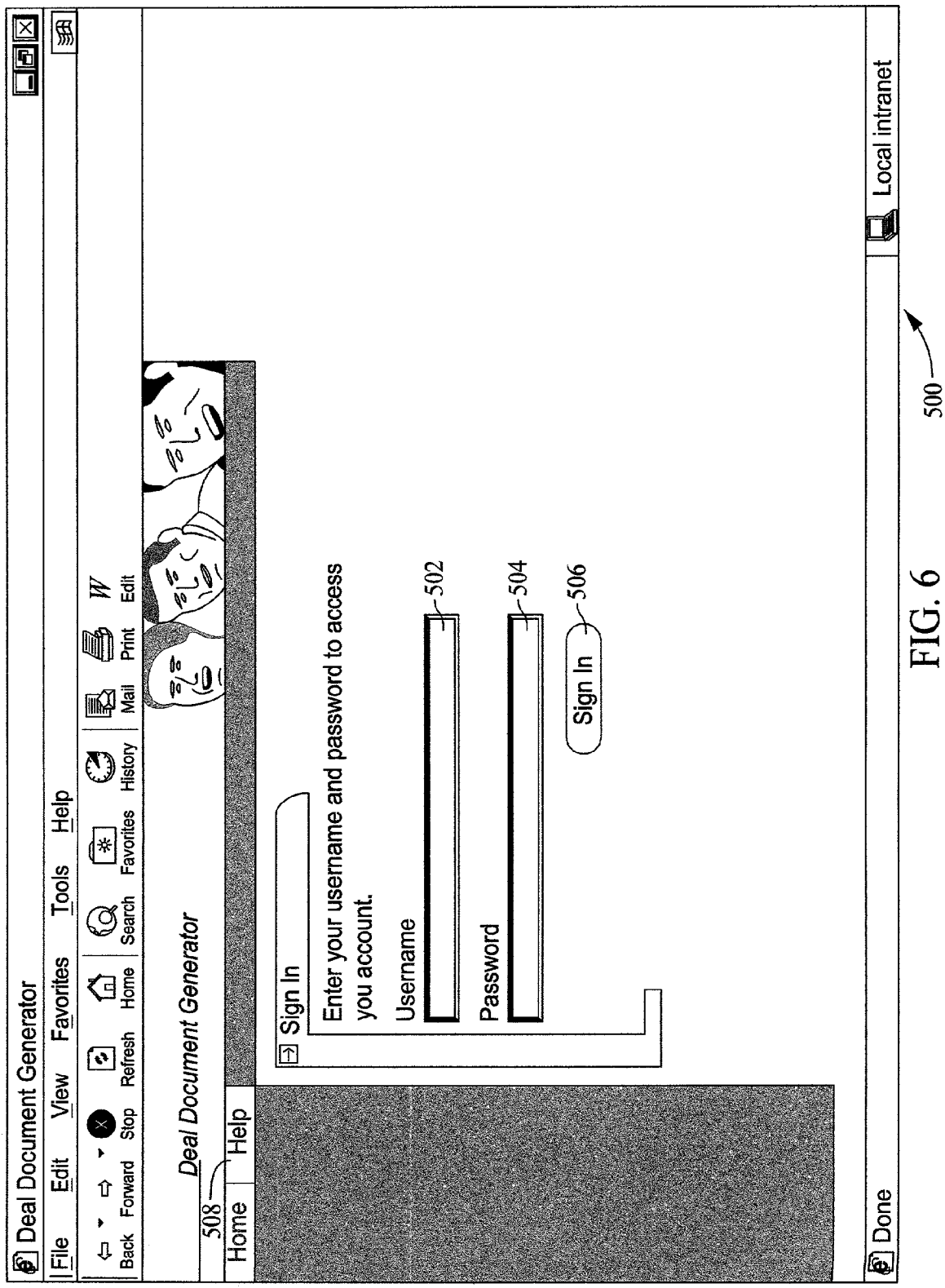
FIG. 6 is an example embodiment of a user interface displaying a log-in page of a DDACS.

FIG. 6 is an example embodiment of a user interface 500 displaying a login page of DDACS 10 (shown in FIGS. 1 and 2). User interface 500 illustrates a User Name field 502 and a Password field 504. All users must have a user name and password to log-on to DDACS 10. In an example embodiment, user interface 500 includes a "Submit" button 506, which the user must select after entering an appropriate user name in User Name field 502 and password in Password field 504. Although buttons are shown in the example embodiment, pull-down lists, clickable elements, check boxes, and other means for inputting this information could also be used. User interface 500 is the entry point to access templates 36 and indirectly database 20 (shown in FIG. 2) via the web or an intranet using a browser. After entering the requested information and selecting Submit button 506, the user enters DDACS 10. User interface 500 also displays a Help tab 508, which enables the user to access information that may help the user navigate DDACS 10.

In the example embodiment, prior to the user logging into DDACS 10, a deal generator administrator designates the user name to be entered into User Name field 502 for each user and a corresponding password to be entered into Password field 504. In addition, the deal generator administrator designates which deals the user may access for assembling documents and how that user's workgroup will be labeled.

Figure 7:
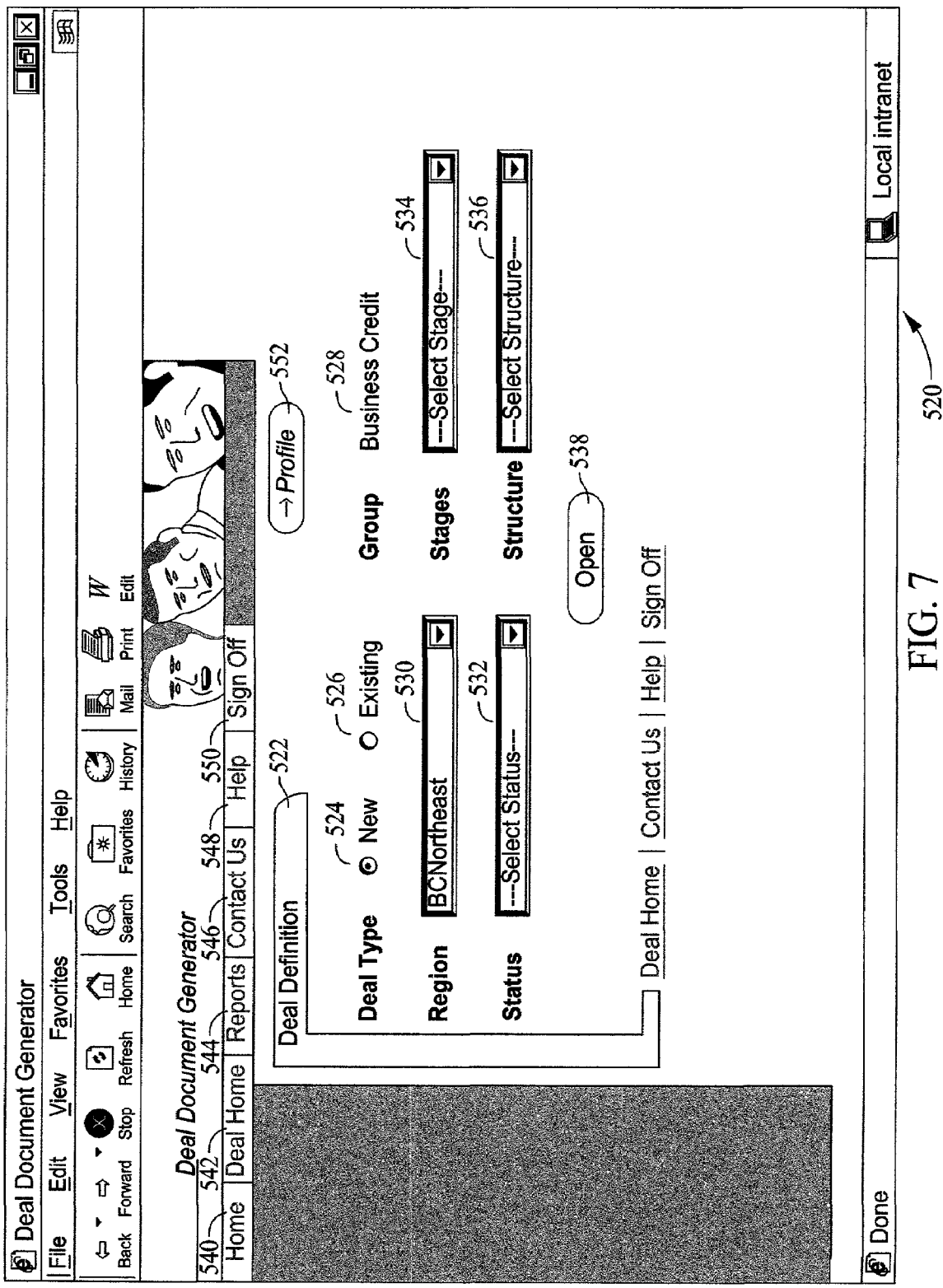
FIG. 7 is an example embodiment of a user interface displaying a Deal Definition page within a DDACS.

FIG. 7 is an example embodiment of a user interface 520 displaying a page within DDACS 10 (shown in FIGS. 1 and 2) after a user has logged onto DDACS 10. User interface 520 displays a "Deal Definition" page 522 which includes a New Deal Type radio button 524, an Existing Deal Type radio button 526, and Business Group label 528. User interface 520 also includes a Business Region pull-down list 530, a Deal Approval Status pull-down list 532, a Deal Workflow Stages pull-down list 534, a Template or "Structure" pull-down list 536, and an Open button 538.

Business Group label 528 displays a business group within the business entity to which the user is assigned. Business Region pull-down list 530 enables the user to input a regional location where the deal is assigned. Deal Workflow Stages pull-down list 534 enables the user to input a current stage in the workflow of the deal. Deal Workflow Status pull-down list 532 enables the user to input a decision status of the deal's closure (i.e., pending or won). Structure pull-down list 536 enables the user to select a class of document to be assembled, here captioned the "Structure" of the deal. After the user inputs data in Business Region pull-down list 530, Deal Approval Status pull-down list 532, Deal Workflow Stages pull-down list 534, and Structure pull-down list 536, the user selects Open button 538. User interface 520 also displays a navigational bar common to all DDACS 10 pages: a Home tab 540, a Deal Home tab 542, a Reports tab 544, a Contact Us tab 546, a Help tab 548, and a Sign Off tab 550. A Profile button 552 allows users to change their passwords.

Figure 8:
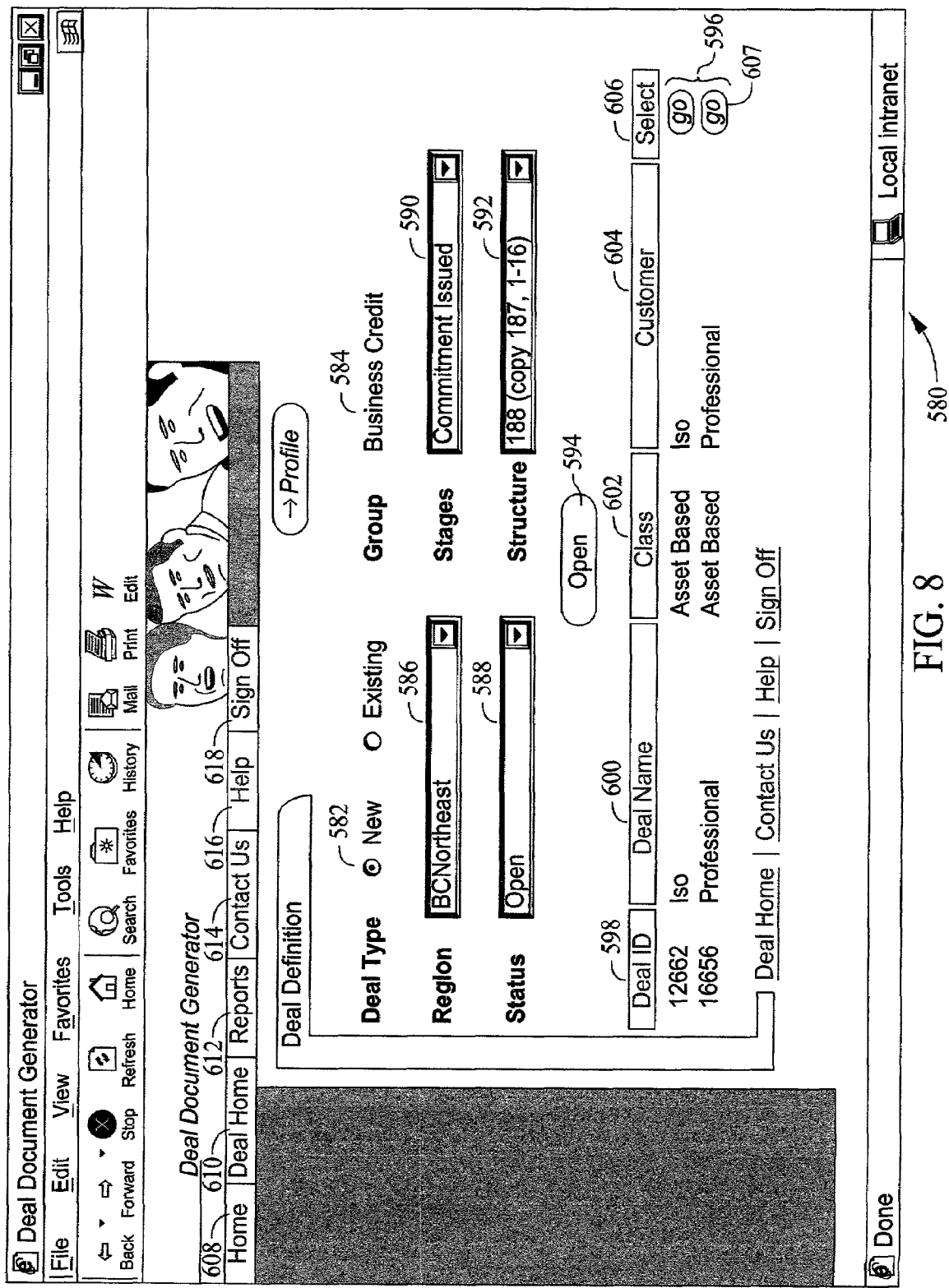
FIG. 8 is an example embodiment of a user interface displaying a Deal Definition page with a list of possible new deals within a DDACS.

FIG. 8 is an example embodiment of a user interface 580 that may be displayed within DDACS 10 (shown in FIG. 1) after a user has entered required information on "Deal Definition" page 522 (shown in FIG. 7). In the example embodiment, user interface 580 displays the results of selecting New Deal Type radio button 582. A Business Region pull-down list 586 showing "BCNortheast" as the regional location of the deal, a Deal Approval Status pull-down list 588 showing "Open" as the decision status of the deal, a Deal Workflow Stages pull-down list 590 showing "Commitment Issued" as the current stage of the workflow of the deal, and a Structure pull-down list 592 showing "188" as the selected template or "structure" of the deal. After inputting the information into user interface 580 and selecting Open button 594, user interface 580 displays a list of deals 596 that correspond with the information entered as described above in user interface 580.

In the example embodiment, user interface 580 displays list of deals 596 in a chart form that includes the following headers: Deal ID 598, Deal Name 600, Class 602, Customer 604, and Select 606. From list of deals 596, the user selects a deal that the user intends to manage for document assembly. More specifically, after selecting the deal by clicking on a Go button 607, that deal's data is loaded so the user is enabled to add, change, or delete deal data relating to the selected deal. User interface 580 also displays the common navigational bar including a Home tab 608, a Deal Home tab 610, a Reports tab 612, a Contact Us tab 614, a Help tab 616, and a Sign Off tab 618.

Figure 9:
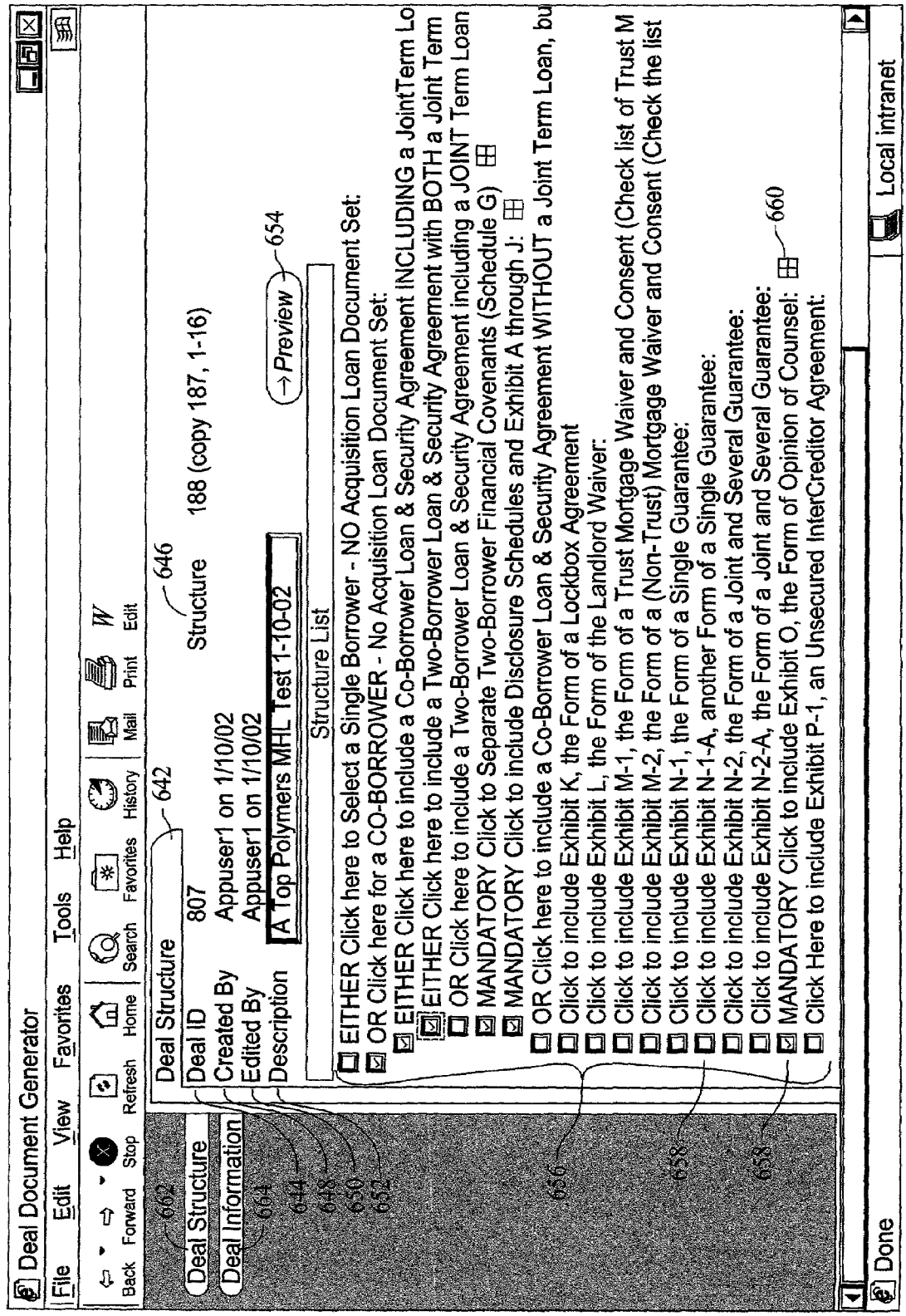
FIG. 9 is an example embodiment of a user interface displaying an intermediate form of the Deal Structure page within a DDACS.

FIG. 9 is an example embodiment of a user interface 640 that may be displayed within DDACS 10 (shown in FIG. 1) after a user has selected a deal to manage from user interface 580 (shown in FIG. 8). User interface 640 displays a page referred to as a "Deal Structure" page 642. Deal Structure page 642 includes Deal ID data 644, Structure data 646, Created By data 648, Edited By data 650, a Description data field 652, and a Preview button 654. In the example embodiment, Deal ID data 644 reports the deal number selected by the user as shown on user interface 580. Structure data 646 corresponds with a deal template selected by the user as shown on user interface 580. Created By data 648 illustrates which user created the deal in DDACS 10, and a date that the deal data was initially created. Edited By data 650 illustrates the user that last edited the selected deal in DDACS 10, and the date at which the deal data was last edited. Description data field 652 enables the user to change the name assigned to the selected deal as displayed in the listing on FIG. 8, Deal Name 600, if so desired. This text may contain version and revision information and other management detail.

In the example embodiment, Deal Structure page 642 also displays a tree-like list of yes-or-no questions 656 relating to possible issues and matters that may be involved in the selected deal, subject to management by the user. If a listed issue or matter is involved in the selected deal, the user should respond "yes" to the particular questions. To respond "yes," the user clicks to the left of the text for the deal structure question in check box 658. To answer "no," the user leaves click box 658 empty next to the particular deal structure question. If there are any related or "follow-up" deal structure questions, the deal structure question tree 656 expands just below the parent question and displays the subsequent deal structure child questions indented, as shown in FIG. 9. In the example embodiment, the last answered question appears in red instead of blue text, and the browser display constantly adjusts to keep the current questions centered on the screen on remote system 14 (shown in FIG. 1). In some cases where it has been so designated by the DDACS administrator when a template is created, a subordinate deal structure question may be automatically marked "yes" if the antecedent deal structure question is answered "yes." If a graphic box surrounding a plus 660 appears at the end of any deal structure question, the user clicks on graphic box 660 such that any undisplayed, subordinate deal structure questions are made visible to the user. Once displayed, the graphic alters to a box surrounding a minus to indicate it is fully expanded (or it disappears if there are no further subordinate structure questions to display). The logic that controls user interface 640 is contained in a selected template, so it may change from one deal to another. When the top of inverted deal structure question tree 656 is reached, the user is at the bottom of Deal Structure page 642, and the deal structure interview is completed.

Preview button 654 enables the user to preview input documents so far called by the selected deal structure before the document to be assembled is finalized. Once saved, the user can also revise the deal structure choices by resetting "yes" answers to "no" by clicking on previously checked boxes. When this occurs, the check box goes blank and the now irrelevant subordinate follow-up questions are no longer displayed. User interface 640 also displays a Deal Structure tab 662 and a Deal Information tab 664. The user clicks Deal Information navigation button 664 when the deal structure interview has been completed.

Figure 10:
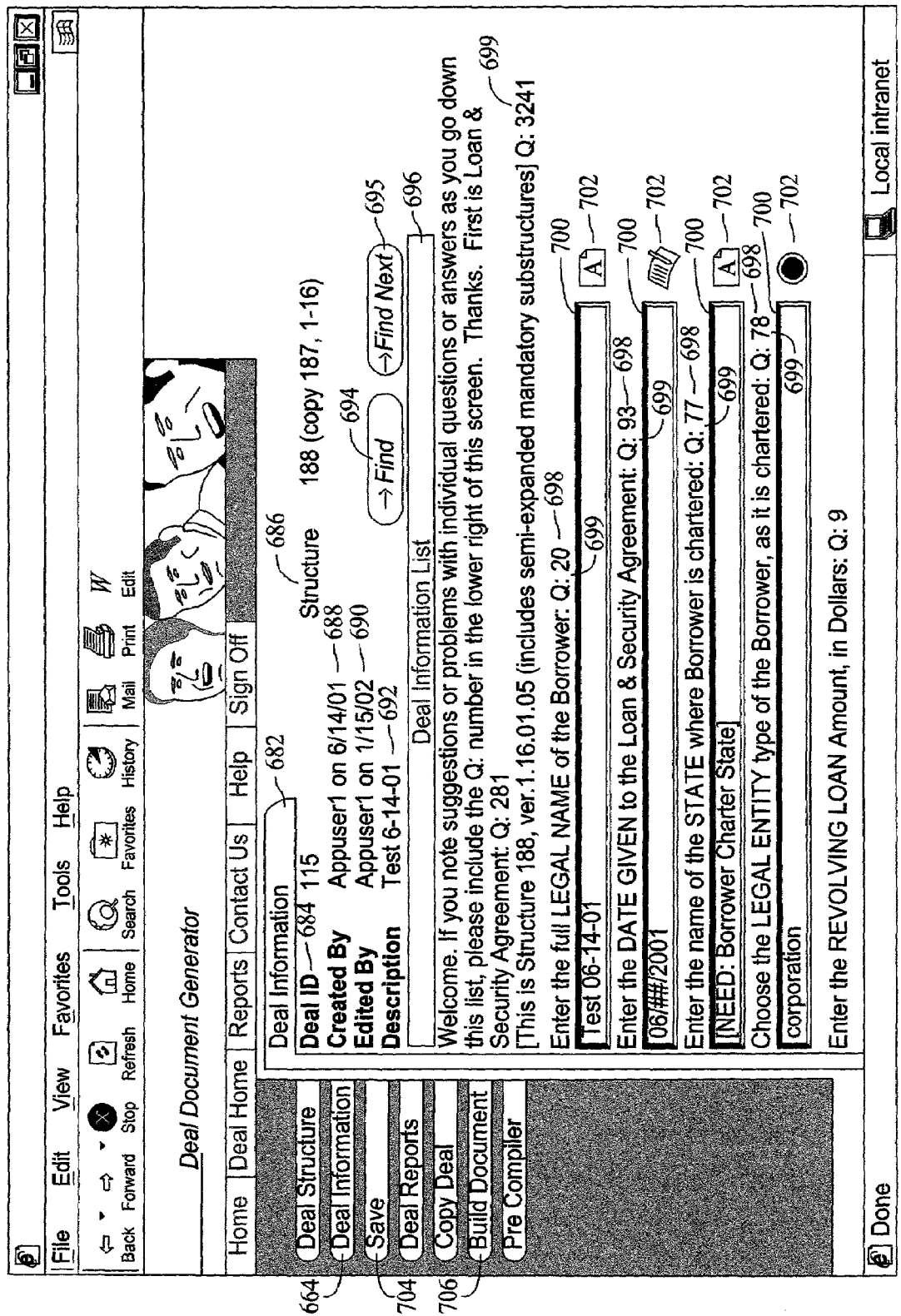
FIG. 10 is an example embodiment of a user interface displaying an upper portion of a Deal Information page within a DDACS.

FIG. 10 is an example embodiment of a user interface 680 that may be displayed within DDACS 10 (shown in FIG. 1) after a user has selected Deal Information tab 664 shown on user interface 640 (shown in FIG. 9). User interface 680 displays a page referred to as a "Deal Information" page 682. Deal Information page 682 includes Deal ID data 684, Structure data 686, Created By data 688, Edited By data 690, Description data 692, a Find button 694, and a Find Next button 695. In the example embodiment, Deal ID data 684 reports the deal selected by the user as shown on user interface 580 (shown in FIG. 8). Structure data 686 corresponds with a template for the deal selected by the user as shown on user interface 580. Created By data 688 illustrates which user created the deal in DDACS 10, and a date that the deal was initially created. Edited By data 690 illustrates the user that last edited the selected deal in DDACS 10, and the date when the deal was last edited. Description data 692 displays a "Deal Name" description assigned to the deal by the user on user interface 640 (shown in FIG. 9).

In the example embodiment, Deal Information page 682 also displays Deal Information List 696 which includes a list of information questions 698 and question ID suffixes 699 and data fields 700 wherein each question 698 is unique and is followed by a question ID suffix 699 and its own unique question ID number field 700. To navigate directly to a known question ID, the user clicks the Find button 694, fills in the question ID in the dialog that appears, and is immediately moved to that information question. Each question 698 prompts the user for information that is entered into data fields 700. The information entered into data fields 700 is subsequently saved and then utilized to replace fill points in an incomplete document to be assembled that the processor module 24 (shown in FIG. 1) and document builder 210 (shown in FIG. 4) generate from input documents 22 (shown in FIG. 1) called for by template 36 (shown in FIG. 2) in conjunction with the deal structure question responses. In the example embodiment, the information entered into data fields 700 typically require keyboard entry of words or numbers. However, dates, multiple choices and external document insertions are supplied using mouse clicking in specific dialogs, opened by clicking on icons 702 adjacent to each information question.

After entering the information into data fields 700, the information is validated on user interface 680, and, if this web page determines that the information entered is not valid, then the user is advised of such and asked to reenter the information. Validation includes testing for illogical data, as well as numbers outside of present limits or with improper separators. In the example embodiment, the validation occurs without interrogation of the processor or the HTML server by the HTML page on remote system 14 (shown in FIG. 1). In the example embodiment, if a repeating question appears within Deal Information List 696, e.g., a signature block caption, the question text suffix 699 changes to show the iteration count so the user can distinguish the first iteration from the subsequent iteration. The Find Next button 695 is used to locate subsequent iterations of such a repeating information question, as they all share the same information question ID. However, if the same date is called for to fill-in blanks a plurality of times within an assembled document, the corresponding information question 698 is only asked once within Deal Information List 696. In addition, most information questions 698 used within Deal Information List 696 have default answers, some of which are updated using prior answers. Typically, the user must take action only to change the default answer in order to enter a response within Deal Information List 696, saving substantial amounts of time when common answers can be predicted. Additionally, a list of unanswered questions handles this too by allowing the administrator to configure each template to indicate which default answers will not be reported as an unanswered question. When the user has completed entering the information in user interface 680, whether or not all questions in Deal Information List 696 have been responded to, the deal can be saved by selecting a "Save" tab 704 such that the deal may be accessed and worked on at a later time. When the user has entered all desired information into user interface 680 and is ready to assemble the deal documents, the user selects "Save" tab 704 and then a "Build Document" tab 706.

Figure 11:
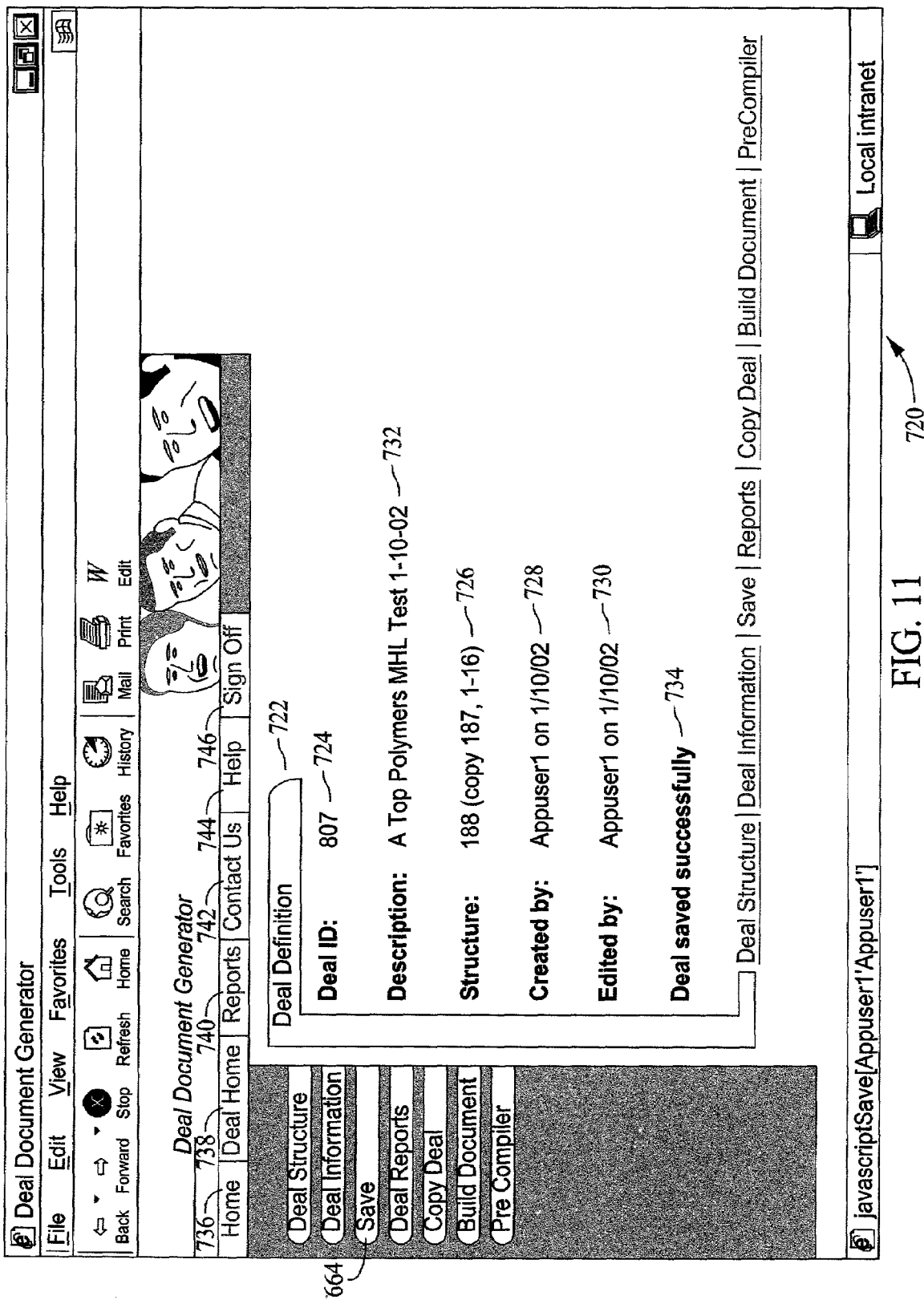
FIG. 11 is an example embodiment of a user interface displaying a Save Information page within a DDACS.

FIG. 11 is an example embodiment of a user interface 720 that may be displayed within DDACS 10 (shown in FIG. 1) after a user has selected Save tab 664 shown on user interface 680 (shown in FIG. 10). User interface 720 displays a page referred to as a "Save Information" page 722. Save Information page 722 includes Deal ID data 724, Structure data 726, Created By data 728, Edited By data 730, and Description data 732. In the example embodiment, Deal ID data 724 reports the deal number selected by the user as shown on user interface 580 (shown in FIG. 8). Structure data 726 also corresponds with a deal template selected by the user as shown on user interface 580. Created By data 728 illustrates the user which created the deal in DDACS 10, and a date that the deal was initially created. Edited By data 730 illustrates the user that last edited the selected deal in DDACS 10, and the date when the deal was last edited. Description data 732 displays the "Deal Name" description assigned to the deal by the user on user interface 640 (shown in FIG. 9).

In the example embodiment, when the user has selected Save tab 664 from user interface 680 and the information is successfully saved, user interface 720 will display a message 734 advising the user that the information has been successfully saved. In the example embodiment, user interface 720 also displays the common navigation bar, including a Home tab 736, a Deal Home tab 738, a Reports tab 740, a Contact Us tab 742, a Help tab 744, and a Sign Off tab 746.

Figure 12:
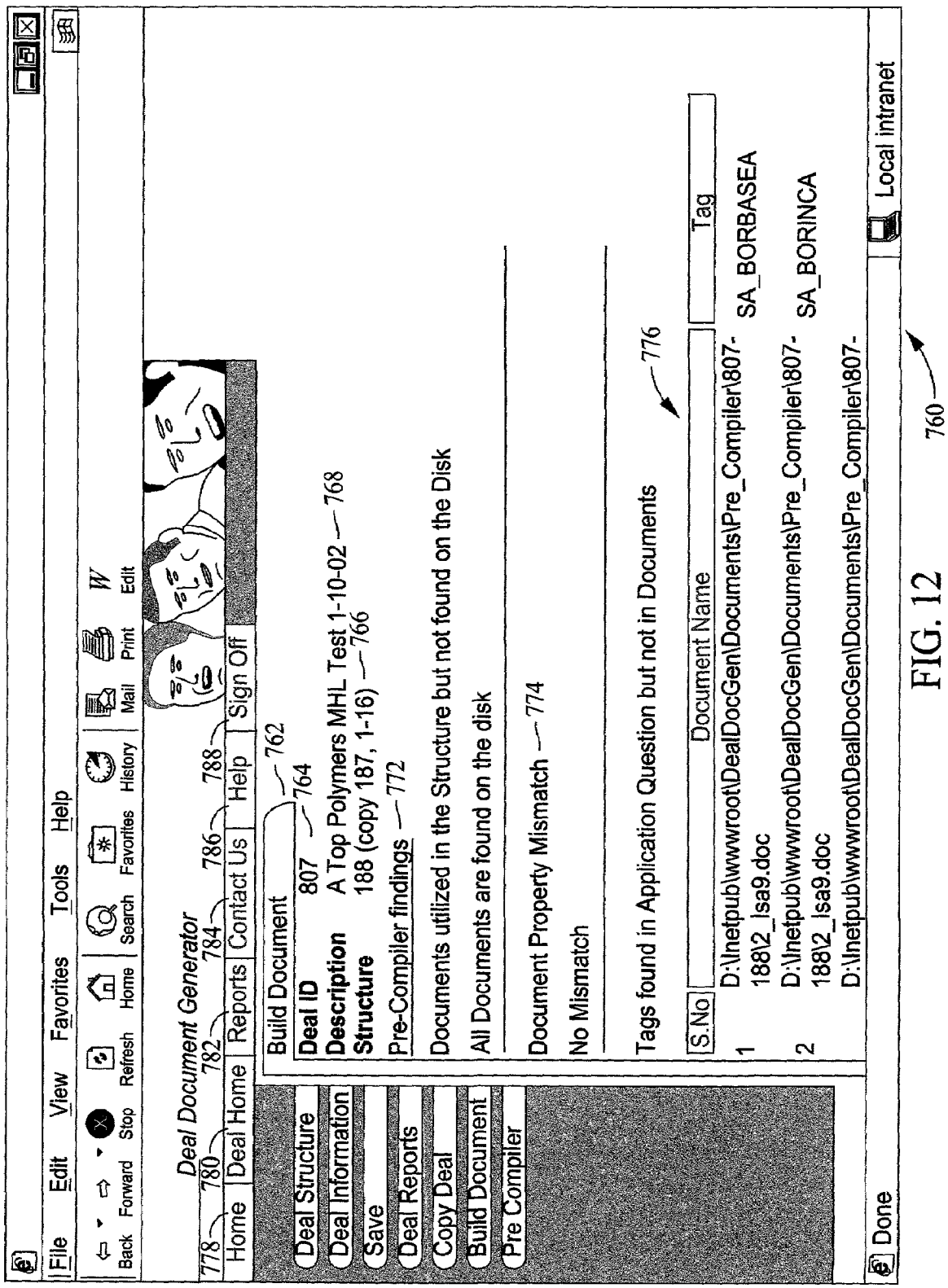
FIG. 12 is an example embodiment of a user interface displaying a first portion of a Build Document page within a DDACS.

FIG. 12 is an example embodiment of a user interface 760 displaying a first portion of a page within DDACS 10 (shown in FIG. 1) after a user has selected Build Document tab 706 shown on user interface 680 (shown in FIG. 10). User interface 760 displays a page referred to as a "Build Document" page 762. Build Document page 762 includes Deal ID data 764, Structure data 766, Description data 768, Pre-Compiler Findings 772, and a Document Property Mismatch caption 774. In the example embodiment, user interface 760 also displays a table entitled: "Tags found in Application Question but not in Documents" 776. In the event one or more input documents are found which are not synchronized, each will be listed below Document Property Mismatch caption table 774 and the processor will not build the document to be assembled. Further, if fill points or "tags" appear in a template but their input documents are not needed for the chosen deal structure, each is listed with its full path below Tags found in Application Question but not in Documents 776. In the example embodiment, user interface 760 also displays the common navigation bar, including a Home tab 778, a Deal Home tab 780, a Reports tab 782, a Contact Us tab 784, a Help tab 786, and a Sign Off tab 788.

Figure 13:
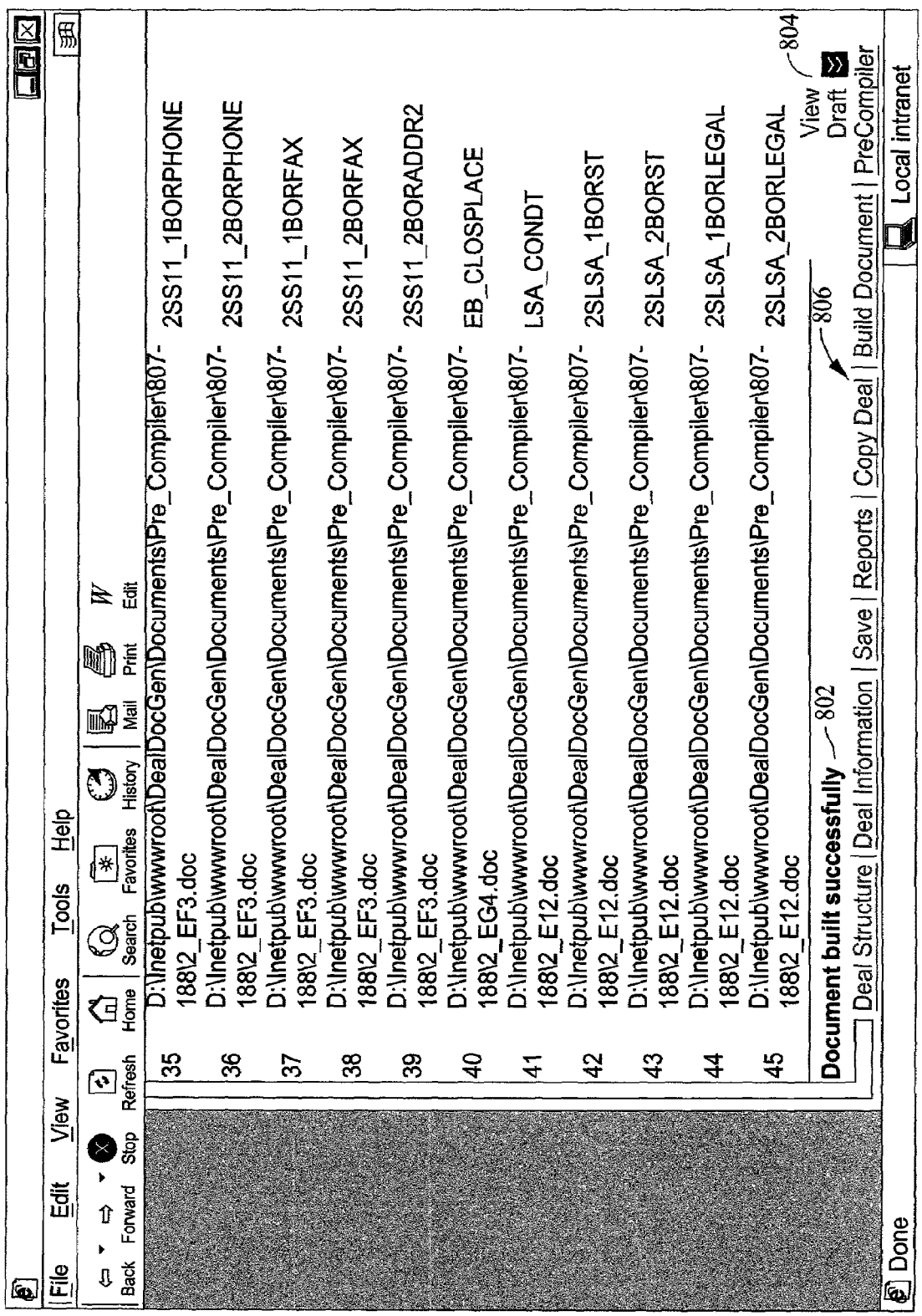
FIG. 13 is an example embodiment of a user interface displaying a second portion of a Build Document page within a DDACS.

FIG. 13 is an example embodiment of a user interface 800 displaying a second portion of a page within DDACS 10 (shown in FIG. 1) after a user has selected Build Document tab 706 shown on user interface 680 (shown in FIG. 10). User interface 800 displays a lower most portion of a page referred to as a "Build Document" page 762 (shown in FIG. 12). The lower portion of Build Document page 762 displays the remaining table entitled: "Tags found in Application Question but not in Documents" 776 (shown in FIG. 12). When the assembled documents have been successfully assembled, user interface 800 displays a message 802 advising the user that the assembled documents have been successfully built. User interface also then displays a View Draft button 804 which enables the user to view a draft of the assembled documents when clicked. At the bottom of this page, as with others in DDACS 10, there are a series of text hyperlinks 806 that match the navigation buttons in the top left margin of the HTML pages: e.g., clicking on "Deal Information" link will move the user to the Deal Information page (shown in FIG. 10) just like clicking on Deal Information tab 664 (shown in FIG. 9).

Figure 14:
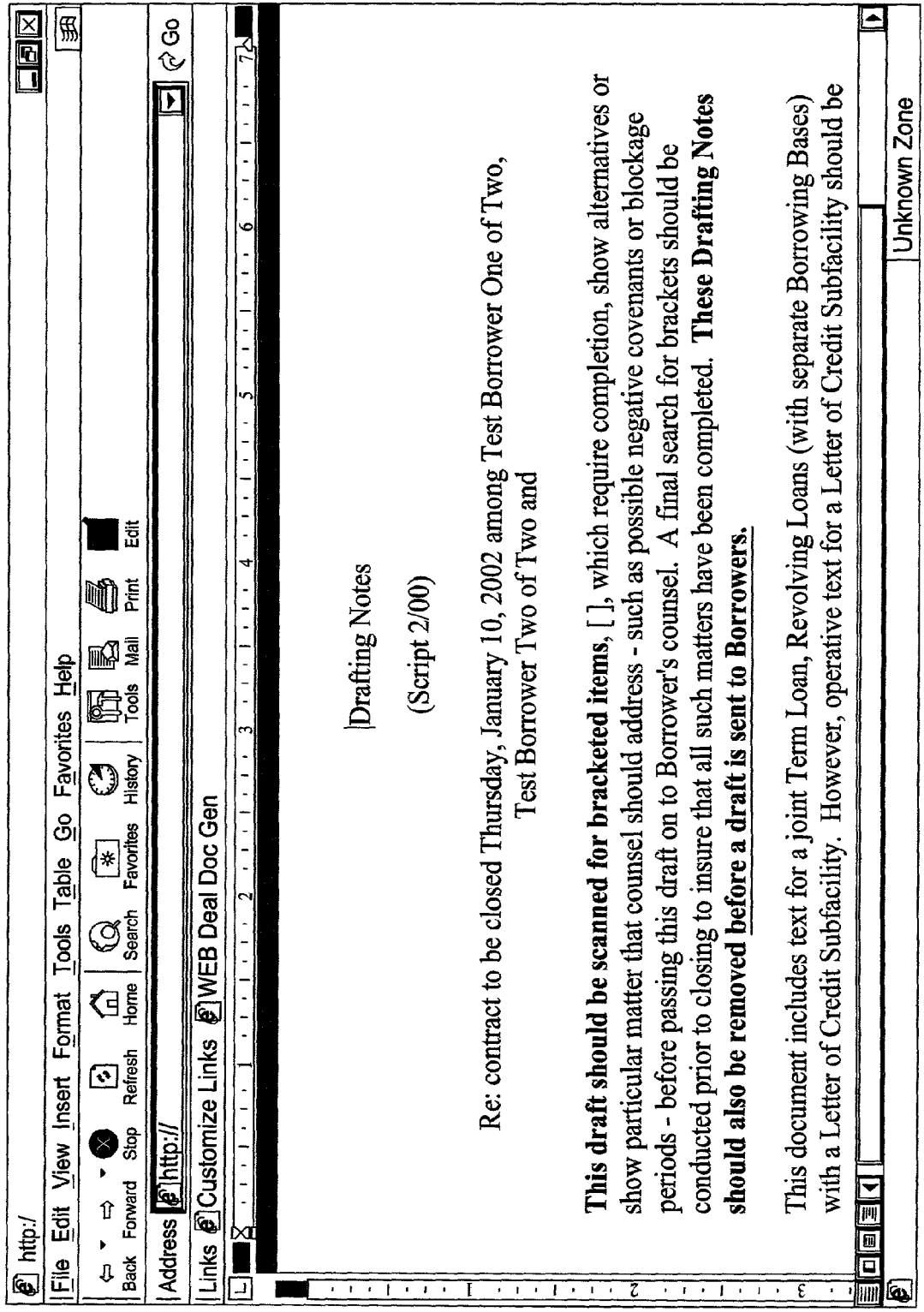
FIG. 14 is an example embodiment of a user interface displaying a Drafting Notes page inside of a specific assembled document within a DDACS.

FIG. 14 is an example embodiment of a user interface 820 that may be displayed within DDACS 10 (shown in FIG. 1) after the assembled documents have been generated. This display pops up when View Draft button 804 (shown in FIG. 13) is clicked. From here the user may save the assembled document in native Word® format, as HTML, or in other formats, or not save it as desired. The assembled document can be fully viewed and fully formatted within this browser window, without having a word processor installed on remote system 14 (shown in FIG. 1). In this example document, the drafting notes are the first page that appears.

Figure 15:
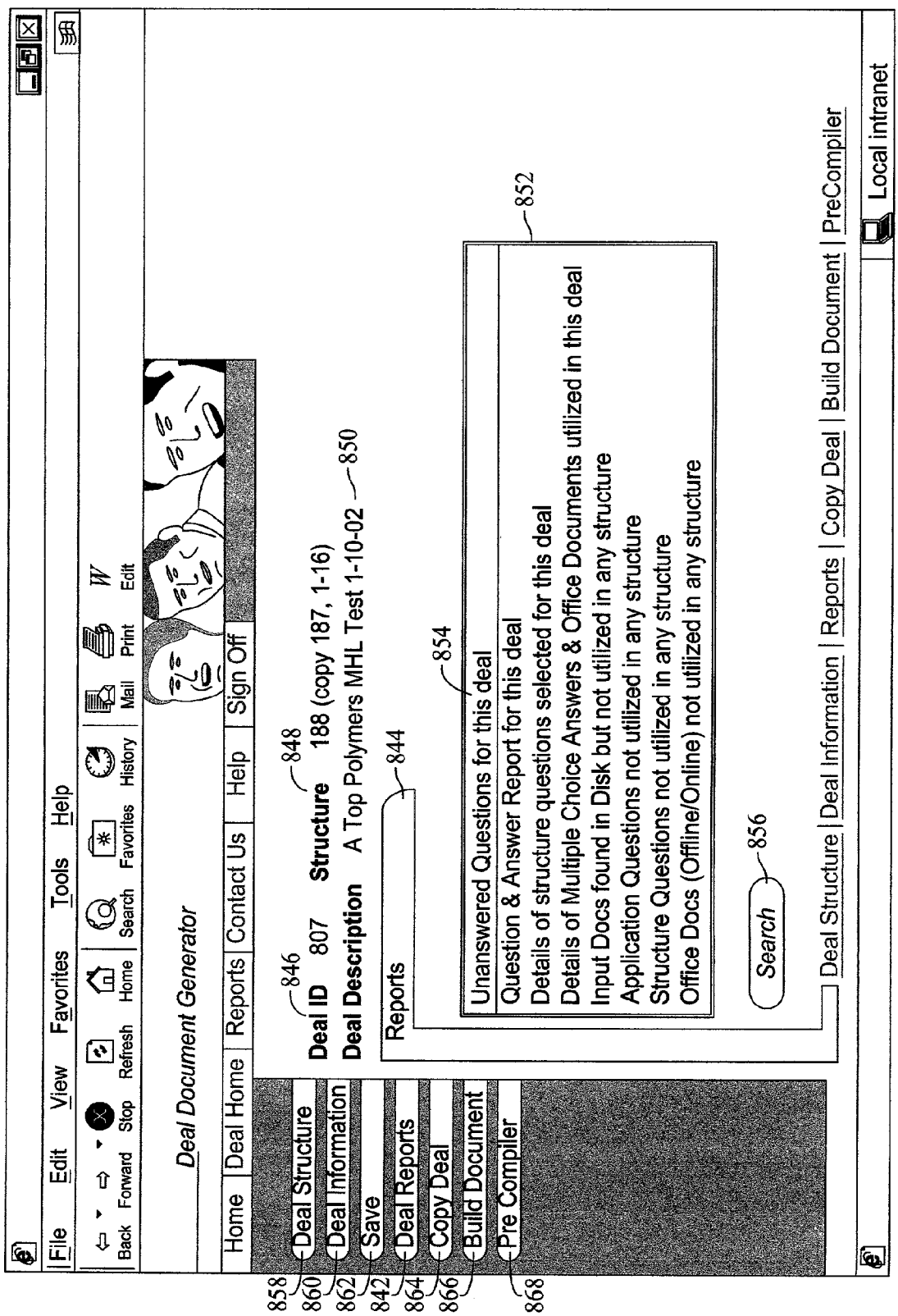
FIG. 15 is an example embodiment of a user interface displaying a Reports home page within a DDACS.

FIG. 15 is an example embodiment of a user interface 840 that may be displayed within DDACS 10 (shown in FIG. 1) after a user has saved a deal's data and then selected a Deal Reports tab 842. User interface 840 displays a page referred to as a "Reports" page 844. Reports page 844 includes Deal ID data 846, Structure data 848, Description data 850, and a list of reports data field 852. List of reports data field 852 displays at least one report 854 that the user can select for displaying the selected report. Once the user has selected the desired report by clicking on its title from list box 852, clicking on a search button 856 causes that report to be produced and displayed to the user.

In the example embodiment, user interface 840 also displays a Deal Structure tab 858, a Deal Information tab 860, a Save tab 862, a Copy Deal tab 864, a Build Document tab 866, and a Pre-Compiler tab 868. Copy Deal tab 864 enables the user to save a duplicate set of deal data under a different Deal ID number, as might be useful for creating or comparing alternative assembled document structures. All of the previously entered responses are also duplicated in such copies. Pre-Compiler tab 868 enables the user to confirm that the saved deal data is approved for document assembly into DDACS 10 without actually building the corresponding assembled documents.

FIG. 16 is an example embodiment of a user interface 880 that may be displayed within DDACS 10 (shown in FIG. 1) after a user has selected Deal Reports 842 and clicked Search button 856 shown on user interface 840 (shown in FIG. 15). In the example embodiment, user interface 880 displays an Unanswered Questions Report 882. User interface 880 displays Deal ID data 884, Structure data 886, Description data 888, Created By data 890, Modified By data 892, Creation Date data 894, Modified Date data 896, and a table 898 illustrating a list of Unanswered Deal Information Questions. Table 898 has table column headers that include: Question ID 900, Unanswered Deal Information Questions 902, and Instance # 904. Accordingly, user interface 880 enables the user to determine the questions that still must be responded to by the user in order to complete the assembled document.

Figure 17A:
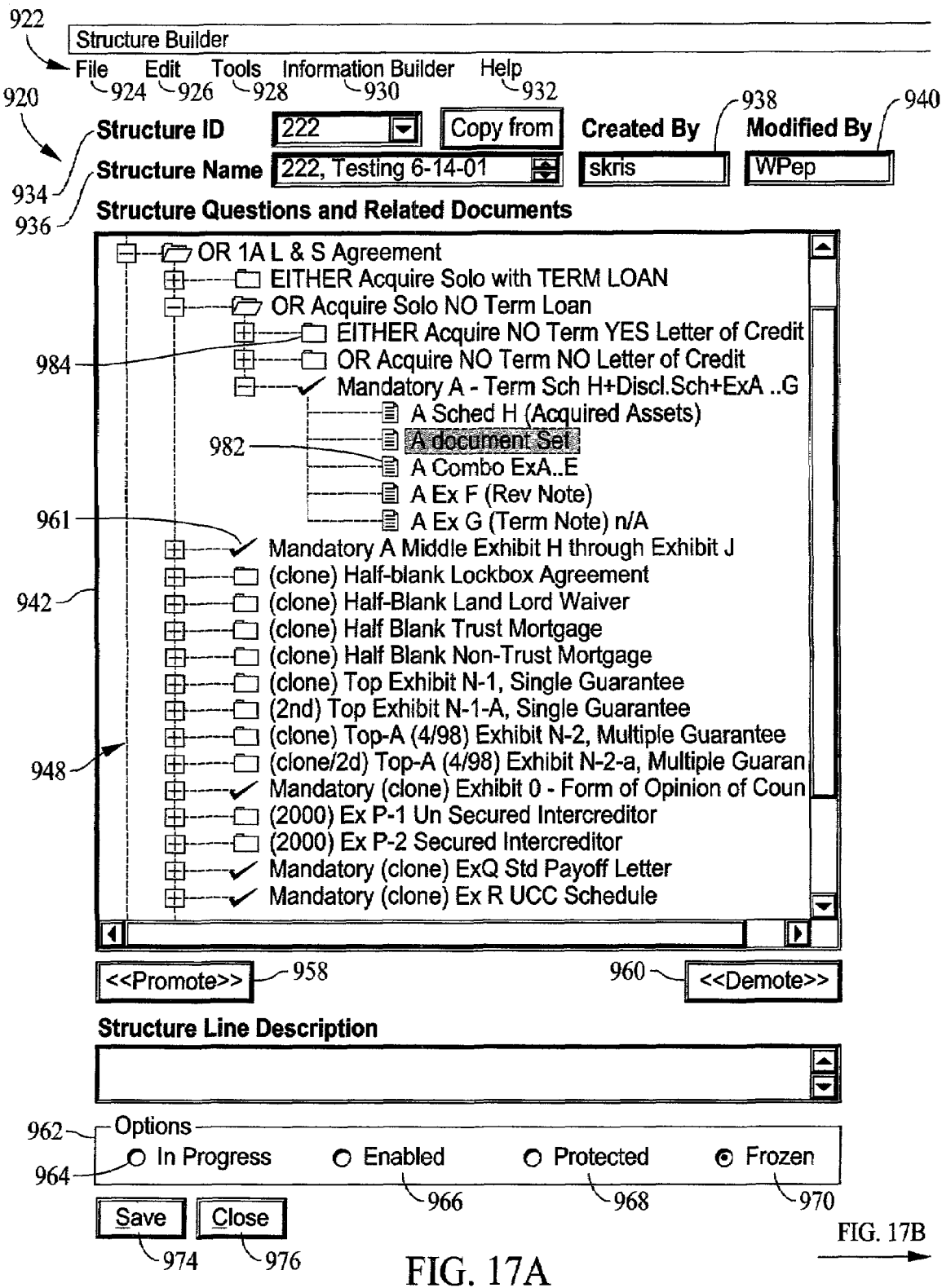

FIGS. 17A and 17B show an example embodiment of a user interface 920 that may be displayed on administration client module 33 (shown in FIG. 2) after the user has accessed DDACS 10 (shown in FIG. 2) as an administrator. User interface 920 enables the administrator to select structure questions that will ultimately be displayed in tree-like list of yes-or-no structure questions 656 (shown in FIG. 9) on remote system 14 (shown in FIG. 1). The tree like list of questions is sometime referred to as a structure questions tree. A structure questions tree is defined as a list of questions that are displayed with related child questions indented immediately below a parent question such that the overall structure of the questions appears like a tree. The structure questions tree displays the controlling content of a template. The structure questions relate to possible issues, subject matter, and contents that may be involved in the selected deal.

In the example embodiment, user interface 920 displays a menu bar 922 at the top of user interface 920 that enables the administrator to navigate and manage the administrative operations included within DDACS 10. Menu bar 922 includes: File pull-down list 924, Edit pull-down list 926, Tools pull-down list 928, Information Builder pull-down list 930, and Help pull-down list 932. User interface 920 also displays a Structure ID pull-down field 934, a Structure Name pull-down list 936, a Created By label 938, and a Modified By label 940. Structure ID pull-down list 934 displays a number, e.g., 222 in the example embodiment, that corresponds with a specific template 36 (shown in FIG. 2) that has been created and saved by the administrator. Choosing a number from the list causes that template to be loaded into administration client module 33. Structure Name pull-down list 936 displays a name or description assigned to each specific template 36 shown in Structure ID pull-down list 934. An administrator may also click on an up or down arrow buttons next to the Structure Name pull-down list 936 to display and choose other deal templates to be loaded into administration client module 33. Created By label 938 illustrates which administrator created specific template 36 loaded and hence displayed on user interface 920. Modified By label 940 illustrates which administrator last modified the specific template 36 loaded and hence shown on user interface 920.

User interface 920 also displays a Structure Questions and Related Documents panel 942, a Structure Questions list 944, and a Documents list 946. Structure Questions list 944 displays the top portion of an inventory of all of the Structure Questions that are available for use in any template within DDACS 10. Documents list 946 displays the top portion of the inventory of all of the Document links that are included within DDACS 10. Structure Questions and Related Documents panel 942 displays on administration client module 33 for a selected template a tree-like list of working Structure Questions and Related Documents 948 that have been selected for use in the structure tree by an administrator from Structure Questions list 944 and Documents list 946 of document links. Tree-like list of Structure Questions and Related Documents 948 for the selected template is the source of the processor's deal structure displayed on remote system 14 (shown in FIG. 1) as shown on user interface 640 (shown on FIG. 9). In other words, user interface 920 enables an administrator to create or revise a template 36 by selecting specific structure questions from Structure Questions list 944 and specific document links from Documents list 946. As the administrator selects and inserts into the structure tree the specific structure questions and specific document links, they are displayed in Structure Questions and Related Documents panel 942 in the same order as they may be used in remote system 14. A left arrow button 950 enables the administrator to insert a specific structure question from Structure Questions list 944 or a specific document link from Documents list 946 to the template's logic tree, which is partly displayed in the structure tree in Structure Questions and Related Documents panel 942. A right arrow button 952 enables the administrator to remove a specific structure question or a specific document link from the structure tree and thus from Structure Questions and Related Documents panel 942.

User interface 920 also includes an up arrow button 954 and a down arrow button 956. Up arrow button 954 and down arrow button 956 enable the administrator to move working structure questions and working document links up or down as they appear within the structure tree shown in panel 942. In the example embodiment, up arrow 954 and down arrow 956 only allow the administrator to move working structure questions and working document links up or down as they appear within their own hierarchical level on the structure tree as shown on panel 942. A Promote button 958 and a Demote button 960 enable the administrator to move working structure questions and working document links up a hierarchical level or down a hierarchical level as they appear within the structure tree and panel 942.

The working structure questions and working document links that are displayed on the structure tree panel 942 relate to possible issues, subject matter and contents that may be involved in a class of selected deals addressed by a particular template. If an issue, content or matter included in the selected template is actually involved in a given deal, a user using remote system 14 should respond "yes" to the particular structure questions. To respond "yes," the user clicks in check box 658 to the left of the text for the structure question (shown in FIG. 9). To answer "no," the user leaves unclicked check box 658 so that it is empty for that particular structure question. If there are any logically dependent or "follow-up" structure questions for that deal, the logic tree displayed in panel 942 expands just below the parent structure question and displays the subsequent child structure questions indented (shown in FIG. 9).

Where it has been so designated by the administrator when a template is created or edited, a structure question may be designated as "Mandatory," which is shown with a checkmark 961 in the example embodiment of user interface 920. This results in a deal structure question being automatically marked "yes" in the processor if the antecedent deal structure question is answered "yes." This result may span more than one subordinate level on the structure tree, and also automatically include one or more document links.

User interface 920 also displays an Options panel 962 that includes an In Progress radio button 964, an Enabled radio button 966, a Protected radio button 968, and a Frozen radio button 970. The administrator can select from In Progress radio button 964 and Enabled radio button 966. In Progress radio button 964 is selected when the administrator is still in the process of building a specific template 36 and specific template 36 is not ready to be tested or used by a user on remote system 14. Enabled radio button 966 is selected when the administrator has completed building a template 36 and template 36 is ready for testing or production use by a user on remote system 14. Protected radio button 968 is selected by the processor automatically when an enabled template 36 has caused a processor audit failure during the assembly of a production document so DDACS 10 wishes to protect template 36 from further use until the audit problem is resolved. Frozen radio button 970 is not selected by the administrator, but instead is activated automatically by DDACS 10. Frozen radio button 970 is activated as soon as an enabled template 36 has been used to assemble an output document for a specific deal. By freezing template 36 that has already been used in a specific deal, changes to the logic in a frozen template 36 are prevented so that, if a saved deal's data is used to assemble a document in the future, DDACS 10 presentation and the assembled document will reliably match the original assembled document. Thus, DDACS 10 facilitates preventing subsequent changes to templates 36 that have already been used in one or more specific deals such that documents relating to that specific deal stored in database 20 (shown in FIG. 1) are not unintentionally altered through a change to that corresponding template 36.

User interface 920 also displays an Undo button 972 that enables an administrator to undo a last action taken, a Save button 974 that enables an administrator to save their entries on user interface 920, a Close button 976 that closes user interface 920, a Structure Question bar 978, and Document Editor bar 980.

Structure Questions and Related Documents panel 942 displays on administration client module 33 for a selected template tree-like list of working Structure Questions and Related Documents 948 that have been selected for use in the structure tree by an administrator from Structure Questions list 944 and Documents list 946 of document links. Tree-like list of Structure Questions and Related Documents 948 for the selected template include at least one working document link 982 and at least one working structure question 984.

Figure 18:
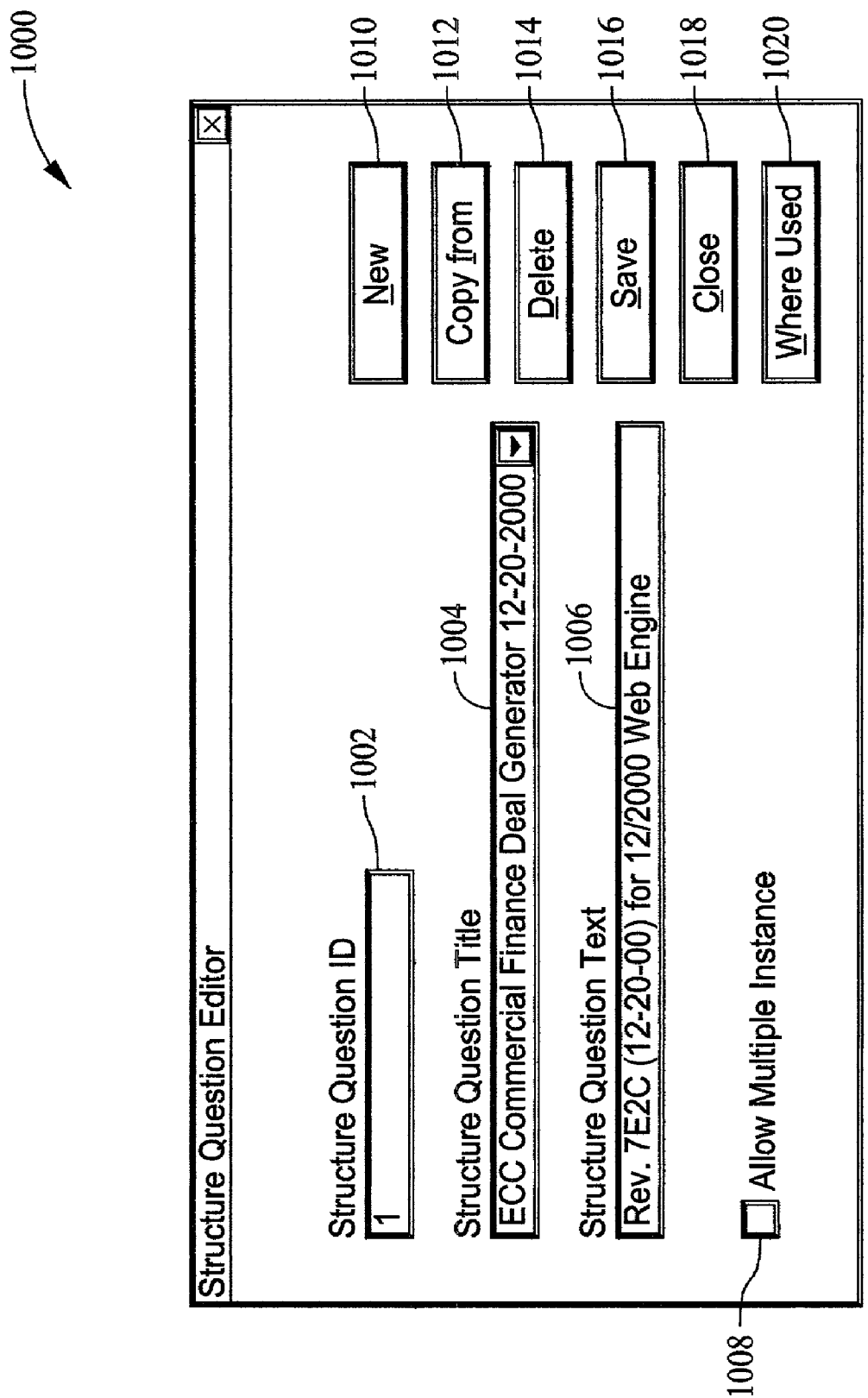
FIG. 18 is an example embodiment of a user interface displaying a Structure Question Editor page within a DDACS.

FIG. 18 is an example embodiment of a Structure Question editing user interface 1000 that may be displayed on administration client module 33 (shown in FIG. 2) after the user has activated DDACS 10 (shown in FIG. 2) as an administrator. User interface 1000 may be displayed in several ways, for example, an administrator may click Structure Question Editor bar 978 (shown in FIGS. 17A and 17B) to access user interface 1000. User interface 1000 enables the administrator to add a new structure question, or edit or delete an existing structure question from Structure Question list 944 on user interface 920 (shown in FIGS. 17A and 17B). User interface 1000 includes a Structure Question ID field 1002, a Structure Question Title pull-down edit box 1004, a Structure Question Text edit box 1006, an Allow Multiple Instance check box 1008, a New button 1010, a Copy From button 1012, a Delete button 1014, a Save button 1016, a Close button 1018, and a Where Used button 1020.

Structure Question ID field 1002 displays an automatically assigned number that corresponds with the structure question being added, edited or deleted from DDACS 10 (shown in FIG. 1). Structure Question Title pull-down edit box 1004 displays and allows revisions to a title that corresponds with the structure question being added, edited or deleted from DDACS 10. Structure Question Text edit box 1006 displays and allows revisions to the text of the structure question being added, edited, or deleted from DDACS 10 as it would appear on processor Deal Structure user interface 640 (shown in FIG. 9) on remote system 14 (shown in FIG. 1). New button 1010 enables the administrator to add a new structure question to Structure Question list 944 (shown in FIGS. 17A and 17B). In the example embodiment, when a new structure question is added, the data fields shown on user interface 1000 are initially blank. If Allow Multiple Instance check box 1008 is selected, any structure questions, linked input documents, or associated information questions subordinate to the selected structure question on structure tree 948 (shown in FIGS. 17A and 17B) will repeat as an entity, as often as the processor user indicates when asked in user interface 640.

Copy From button 1012 enables an administrator to copy an existing structure question content so that a new structure question can be completed by editing by the administrator. Delete button 1014 enables the administrator to delete an existing structure question. Save button 1016 enables the administrator to save an existing structure question within DDACS 10 by adding it to Structure Question list 944. The administration module will not permit a revised Structure Question to be saved if that Structure Question is used in any Frozen or Locked template. Close button 1018 enables an administrator to close user interface 1000. In the example embodiment, when Close button 1018 is selected and the editor contains unsaved content, the administrator will be asked whether the user wants to close user interface 1000 without saving to facilitate preventing loss of work. If the administrator forgets to save, user interface 1000 offers an opportunity to save without requiring it.

When selected, Where Used button 1020 displays a list of other templates 36 (shown in FIG. 2) that use as a working structure question the specific structure question being edited or deleted through user interface 1000. Since administration client module 33 (shown in FIG. 2) will not allow a structure question to be deleted if it is a working structure question in any template, Where Used button 1020 enables the administrator to avoid editing or deleting a structure question already being utilized in any frozen template 36.

Figure 19:
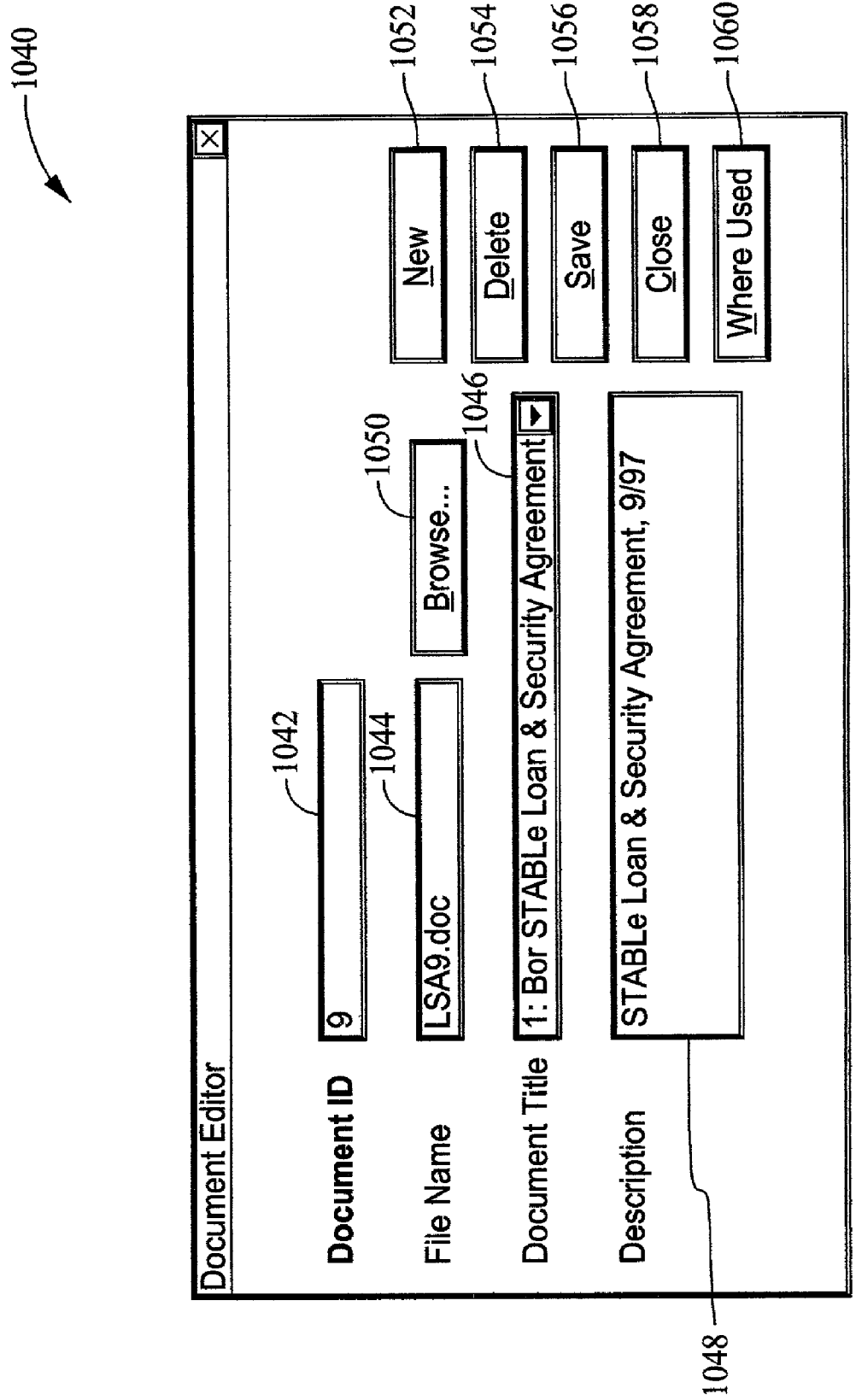
FIG. 19 is an example embodiment of a user interface displaying a Document Link Editor page within a DDACS.

FIG. 19 is an example embodiment of a Document link editing user interface 1040 that may be displayed on administration client module 33 (shown in FIG. 2) after the user has activated DDACS 10 (shown in FIG. 2) as an administrator. User interface 1040 may be displayed in several ways, for example, an administrator may click Document Editor bar 980 (shown in FIGS. 17A and 17B). User interface 1040 enables the administrator to add a new document link or revise or delete an existing document link in Document list 946 on user interface 920 (shown in FIGS. 17A and 17B). User interface 1040 includes a Document ID field 1042, a File Name field 1044, a Document Title pull-down field 1046, a Description field 1048, a Browse button 1050, a New button 1052, a Delete button 1054, a Save button 1056, a Close button 1058, and a Where Used button 1060.

Document ID field 1042 displays an automatically assigned number that corresponds with the document link being added, revised, or deleted from Document list 946. File Name field 1044 displays an input document file name used in the specific document link. Like Structure Question list 944, Document list 946 is stored in database 20 (shown in FIG. 1). Document Title pull-down edit box 1046 displays and permits editing of a title that corresponds with the specific document link as it appears in Document list 946. Description field 1048 displays and permits editing of a description of the specific document link, which description is viewable only by the administrator. Browse button 1050 enables the administrator to fill out File Name field 1044, by browsing an input document directory stored in database 20 to locate a specific input document that should be associated with the specific document link, as the file name cannot be entered by the user otherwise.

New button 1052 enables an administrator to add a new document link to Document field 946. In the example embodiment, when a new document link is added, the data fields shown on user interface 1040 are initially blank. Delete button 1054 enables the administrator to delete an existing document link from Document list 946. Save button 1056 enables the administrator to save a new document link within DDACS 10. The administration module will not permit a revised document link to be saved if that document link is used in any Frozen or Locked template. Close button 1058 enables an administrator to close user interface 1040. In the example embodiment, when Close button 1058 is selected the user will be asked whether the user wants to close user interface 1040 with or without saving.

When selected, Where Used button 1060 displays a list of other templates 36 (shown in FIG. 2) that include the specific document link being deleted through user interface 1040 as a working document link. Thus, Where Used button 1060 assists the administrator in avoiding deleting or editing a working document link already being used in a frozen template 36.

Figure 20A:
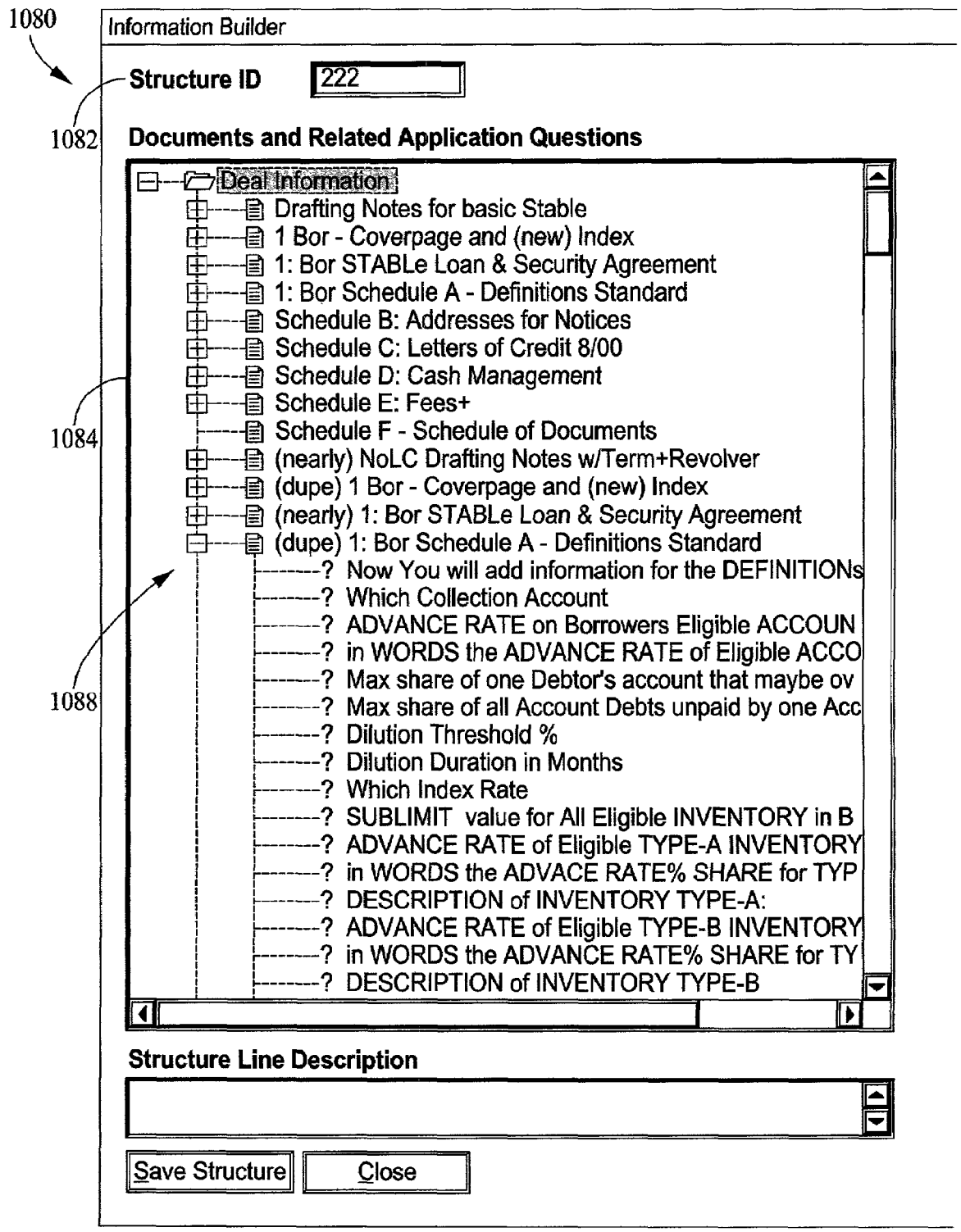

FIGS. 20A and 20B is an example embodiment of an Information Question management user interface 1080 that may be displayed by administration client module 33 (shown in FIG. 2) after the user has activated DDACS 10 (shown in FIG. 2) as an administrator. User interface 1080 enables the user to select and manage information questions that are then displayed in the processor as appropriate on user interface 680 (shown in FIG. 10) via remote system 14 (shown in FIG. 1). The information questions relate to specific data that may be needed to fill out details in the assembled document called for by a selected deal structure displayed in user interface 640 (shown in FIG. 9).

User interface 1080 displays a Structure ID field 1082 that displays a number, e.g., 222 in the example embodiment, that corresponds with a specific template 36 (shown in FIG. 2) created by the administrator. User interface 1080 also displays a Documents and Related Application Questions panel 1084, and a top portion of an Application Questions list 1086. Application Questions list 1086 can display any of the information questions that are included within DDACS 10 and any templates in DDACS 10. Documents and Related Application Questions panel 1084 displays on administration client module 33 a tree-like list of document links and related information questions 1088 in panel 1084 that have been selected by the administrator from Application Questions list 1086 and used as part of the logic tree for the specific template identified at Structure ID filed 1082. The information tree is used when this part of the template is used on remote system 14 (shown in FIG. 1) to create a Deal Information web page as shown on user interface 680 (shown in FIG. 10). In other words, user interface 1080 enables the administrator to create and manage information questions by selecting specific deal information questions from Application Questions list 1086, editing them, and arranging them logically on the information tree. As the administrator uses the specific information questions, they are displayed in Document and Related Application Questions panel 1084 because they are in the template's information tree, and therefore, the information questions will be used in user interface 680 through remote system 14.

A left arrow button 1090 enables the administrator to insert a specific information question from Application Questions list 1086 into the information tree such that it displays in Documents and Related Application Questions panel 1084, and a right arrow button 1092 enables the administrator to remove a specific information question from the information tree and thus from Documents and Related Application Questions panel 1084.

User interface 1080 also includes an up arrow button 1094 and a down arrow button 1096. Up arrow button 1094 and down arrow button 1096 enable the administrator to move information questions up or down within those information questions associated with a given document link, as they appear within the information tree. By moving the deal information questions up and down, the administrator can select the order in which the deal information questions appear on user interface 680 (shown in FIG. 10).

User interface 1080 also displays an Undo button 1098 that enables an administrator to undo a last action taken, a Refresh button 1100 that enables a user to refresh and update user interface 1080, and an Application Question Editor bar 1102 that enables an administrator to open an Application Question Editor so to add, edit, and delete the information questions.

Figure 21:
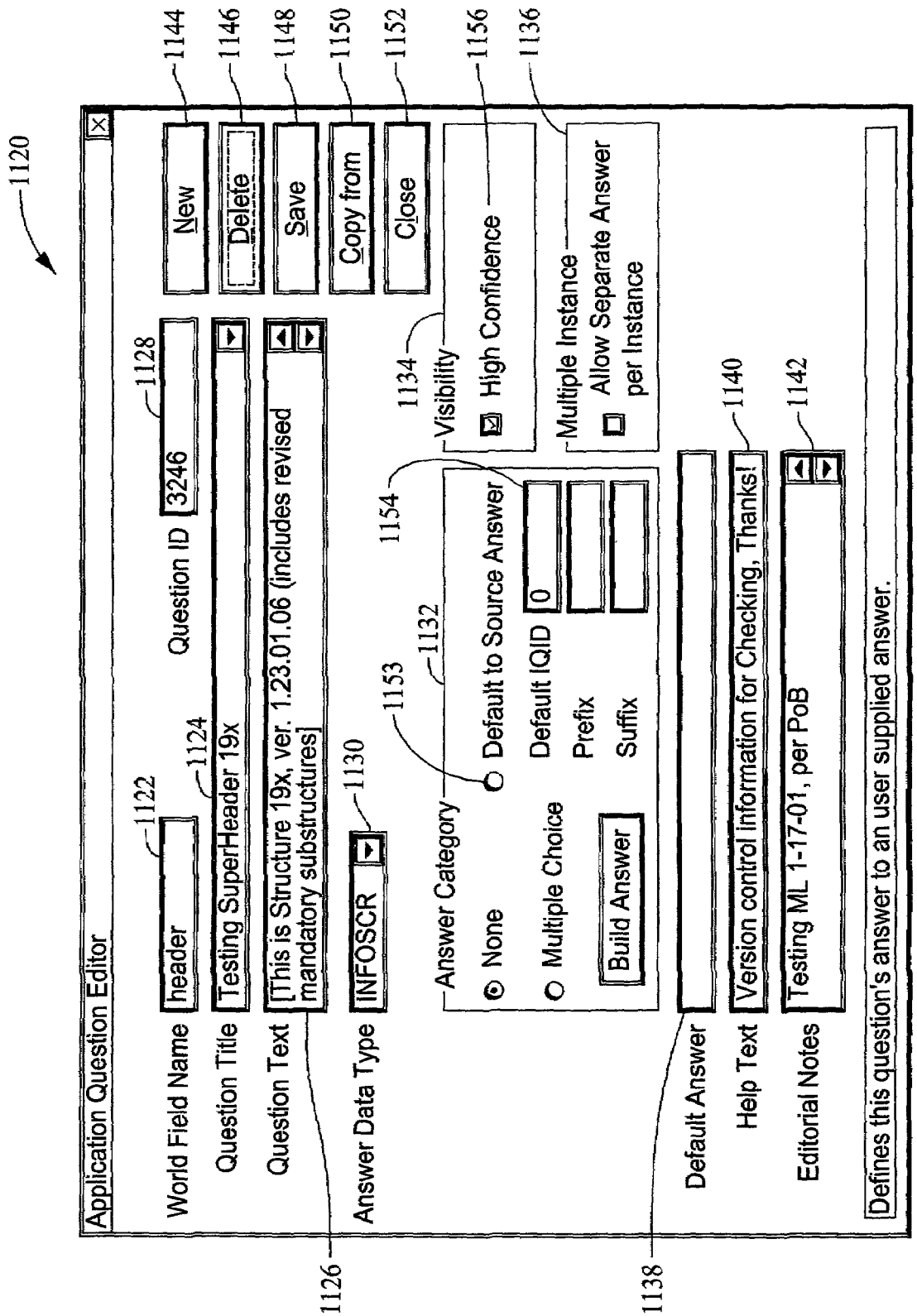
FIG. 21 is an example embodiment of a user interface displaying a Deal Information Question Editor page within a DDACS.

FIG. 21 is an example embodiment of an Application Question editing user interface 1120 that may be displayed on administration client module 33 (shown in FIG. 2) after the user has activated DDACS 10 (shown in FIG. 2) as an administrator. User interface 1120 may be displayed in several ways, for example, an administrator may select Application Question Editor bar 1102 (shown in FIGS. 20A and 20B). User interface 1120 enables the administrator to add, edit, delete, and manage information questions as they appear in Application Questions list 1086 (shown in FIGS. 20A and 20B) and information question tree 1088 (shown in FIGS. 20A and 20B). User interface 1120 includes a Word Field Name field 1122, a Question Title pull-down edit box 1124, a Question Text pull-down edit box 1126, a Question ID field 1128, an Answer Data Type pull-down list 1130, an Answer Category Section 1132, a Visibility Section 1134, a Multiple Instance Section 1136, a Default Answer edit box1138, a Help Text edit box 1140, an Editorial Notes edit box 1142, a New button 1144, a Delete button 1146, a Save button 1148, a Copy From button 1150, and a Close button 1152.

Word Field Name field 1122 displays a fill point name that corresponds with a previously configured "fill-in" section within an input document that may be used in a document to be assembled. Thus, the field name shown in Word Field Name field 1122 illustrates where the data to be entered in response to the information question exemplified will be located within a document to be assembled. Question Title pull-down edit box 1124 displays and allows creation and revision to a title that corresponds with the specific information question as it would appear in Application Questions list 1086 and any corresponding working information question in any template. Question Text pull-down edit box 1126 displays and allows creation and revisions to a specific information question as it may appear on user interface 680 (shown in FIG. 10). Question ID field 1128 displays an automatically assigned, unique number that corresponds with the specific deal information questions.

Answer Data Type pull-down list 1130 displays a type of answer that DDACS 10 (shown in FIG. 1) should receive in response to the specific information question. Answer Data Type pull-down list 1130 is at least one part of a validity check that DDACS 10 performs. In the example embodiment, Answer Data Type pull-down field 1130 includes at least one of text, numeric, boolean, date, currency, all numeric text, information on screen without response, and office document. Thus, if a user enters a response to a specific information question and the response does not correspond with the type of answer selected in Answer Data Type pull-down list 1130, then after DDACS 10 performs its validation process the user will receive an error message advising that the response was not valid. And if the administrator selects the office document Data Type, the information tree is enabled to elicit a processor user's choice to insert any approved document or spreadsheet into the assembled document at the location designated by the administrator.

Answer Category Section 1132 offers an administrator choices to add features to an information question such as creating multiple choice answers that will be provided to a user for a specific information question, configuring a default answer based on a response to another information question, or to add or revise a prefix or suffix automatically added to any response to this information question. The multiple choice answers are offered as appropriate to the processor user on remote system 14 (shown in FIG. 1). Answer Category Section 1132 also enables a administrator to select how a default answer will be provided if a user does not answer the specific deal information question. If a Default to Source Answer radio button 1153 is selected, the administrator must also indicate which other information question response should supply this information questions' default answer by selecting that other information question by its Information Question ID in Default IQID field 1154. Whether or not such a Source Answer is selected, the administrator must also provide a default answer in Default Answer field 1138. If the administrator is highly confident that the default answer however configured will be the final answer, then the administrator may select a High Confidence check box 1156 within Visibility Section 1134. In the example embodiment, if High Confidence check box 1156 is selected, this specific deal information question will not be counted as an unanswered question within a report generated to list unanswered questions by DDACS 10.

Multiple Instance Section 1136 enables the administrator to select how the specific deal information question should be shown with repeating elements of an assembled document, for example multiple signatories, on user interface 680 through remote system 14. This check box in conjunction with Allow Multiple Instance check box 1008 (shown in FIG. 18) control repeating elements within an assembled document. If Multiple Instance Section 1136 is activated by the administrator that information question will repeat as often as the processor user selects for that part of the assembled document so long as the structure question parent to the document link that in turn is parent to this information question was also selected to Allow Multiple Instances check box 1008. However, such an information question with such a repeating parent Structure Question will nevertheless not repeat if Multiple Instance Section 1136 is not activated, instead it is only presented once to the user by the processor. This allows each of many multiple signatories to bear the same date in the assembled document without asking the processor user to enter that signature date more than once while asking for each of multiple signatories.

New button 1144 enables an administrator to add a new deal information question to Application Questions list 1086. Delete button 1146 enables the administrator to delete an existing information question from Application Questions list 1086. Save button 1148 enables the administrator to save a new information question within DDACS 10. Copy From button 1150 supplies the content of an existing Information Question for editing as a new Information Question is created, so that the administrator need not enter all the data from scratch. Close button 1152 enables an administrator to close user interface 1120, and an offer to save any unsaved work will be made as appropriate.

DDACS 10 therefore enables a business entity to manage deal data, including at least one of business information, a deal description or definition, a deal template and structure, deal information, deal document links, and the client parties involved in the business deal. DDACS 10 also prompts the users to input deal data, and to then select from a list of issues and documents the specific logical documents that are actually involved in the business deal using professionally meaningful questions and expert logic built into the template selected for that deal rather than the names of those documents. DDACS 10 then enables the user to generate the assembled documents relating to the business deal such that the deal can be negotiated and documented. In addition, DDACS 10 provides the user with help features, notes, and other comments during the generation of the deal documents that help the user to easily navigate the questions involved and generate and finalize the deal documents. Lastly, DDACS 10 provides the user with a plurality of reports regarding deal data entered into the system and advises when additional information is needed to assure that the deal assembled documents are complete. By enabling a business entity to implement business rules and better manage deal data, DDACS 10 facilitates reducing transaction costs for the business entity, facilitates reducing the amount of time spent on each transaction by the business entity, and facilitates generating documents that better reflect the terms and conditions of the deal.

While the invention has been described in terms of various specific embodiments, those skilled in the art will recognize that the invention can be practiced with modification within the spirit and scope of the claims.

What is claimed is:

1. A document assembly production system comprising:

a server having a plurality of templates and other document assembly assets including a plurality of input documents stored therein, each template including logic imbedded within the template for controlling a structure of an assembled document, for controlling displaying document structure questions, and for identifying input documents used for performing document assembly; and at least one remote computer configured to communicate with said server directing said server to access said plurality of templates and said other assembly assets to assemble fully formatted documents without using any document-assembly software and word processing software stored on said at least one remote computer, said at least one remote computer configured to:

prompt a user to select a template from the plurality of templates, each template is associated with a class of document to be assembled for a type of transaction, wherein each document class includes a plurality of document types, each document type represents specific contractual provisions typically associated with completing the corresponding transaction type;

display document structure questions, wherein the document structure questions displayed are controlled by the logic and conditions imbedded in the selected template and are displayed in a tree format without further communication with said server, the document structure questions identifying a predetermined plurality of contractual provisions that the user can select from for inclusion within the assembled document, the document structure questions linked to specific document types representing the predetermined plurality of contractual provisions, wherein by responding to the document structure questions the user includes the selected contractual provisions within the assembled document to complete the transaction type;

receive a response for each document structure question displayed, wherein the document structure responses and the logic imbedded within the selected template determine the document types included within the assembled document;

identify pre-assigned, modifiable input documents from the plurality of input documents compatible with the selected template and the document structure responses for generating the documents to be assembled, the identified input documents including data fill-points;

display transaction questions, wherein the transaction questions displayed are controlled by logic and conditions imbedded in the selected template and the document structure responses;

receive a response for each transaction question displayed, wherein the transaction responses populate the data fill-points included within the identified input documents, the transaction responses checked for validity using the logic imbedded within the selected template and without further communication with said sever; and transmit data identifying the input documents and the transaction responses received to said server for generating the assembled document.

2. A document assembly system in accordance with claim 1 further comprising at least one database coupled to said server, each template stored in said database.

3. A document assembly system in accordance with claim 2 wherein said database comprises at least one security system that limits access to said database to authorized users.

4. A document assembly system in accordance with claim 1 wherein said at least one remote computer is further configured to communicate with said server to restructure and reassemble a previously assembled document.

5. A document assembly system in accordance with claim 1 wherein said at least one remote computer is further configured to communicate with said server to restructure and reassemble previously assembled documents by performing at least one of changing parameters within the previously assembled document, and adding new data to the previously assembled document while reusing organizational elements and document specific data common to the previously assembled document.

6. A document assembly system in accordance with claim 1 wherein said at least one remote computer is further configured to communicate with said server to assemble documents from an invoked template and said other assembly assets to assure compliance with state and federal laws, rules, and regulations, and business entity rules, regulations, and policies.

7. A document assembly system in accordance with claim 1 wherein said at least one remote computer is further configured to communicate with said server to integrate pre-approved documents from another computer system into said assembled document as said documents are being assembled.

8. A document assembly system in accordance with claim 1 wherein said at least one remote computer is further configured to communicate with said server to display at least one of a user identity who created said document assembly and the workflow status of said document assembly.

9. A document assembly system in accordance with claim 1 wherein said at least one remote computer is further configured to communicate with said server to display a report including at least one of a summary of all document assembly elements, a summary of missing and incomplete parameters, and a summary of missing and corrupted document assembly elements.

10. A document assembly system in accordance with claim 9 wherein said at least one remote computer is further configured to communicate with said server to displayed the report prior to finalizing the assembly of the fully-formatted documents.

11. A document assembly system in accordance with claim 1 wherein said at least one remote computer is further configured to communicate with said server to provide secure access to said server such that only authorized users can access said document assembly data, reports generated by said system relating to said assembled documents, data links provided within said system, and data stored in at least one database coupled to said server.

12. A document assembly system in accordance with claim 1 wherein each document class is associated with a specific type of business transaction and comprises a plurality of document types, each document type represents specific contractual provisions typically associated with documenting the specific type of business transaction including alternative and optional contractual provisions selectable by the user based on the specific type of business transaction being documented.

13. A document assembly production system comprising:
a server;
a database coupled to said server for storing a plurality of templates and other document assembly assets including a plurality of input documents, each template including logic imbedded within the template for controlling a structure of an assembled document, for controlling displaying document structure questions, and for identifying input documents used for performing document assembly; and
at least one remote computer in communication with said server, said server in communication with a processor module, said at least one remote computer configured to communicate with said server directing said server to access said plurality of templates and said other assembly assets to assemble fully formatted documents without using any document-assembly software and word processing software stored on said at least one remote computer, said at least one remote computer further configured to:
prompt a user to select a template from the plurality of templates, each template is associated with a class of document to be assembled for a type of transaction, wherein each document class includes a plurality of document types, each document type represents specific contractual provisions typically associated with completing the corresponding transaction type;
display document structure questions, wherein the document structure questions displayed are controlled by the logic and conditions imbedded in the selected template and are displayed in a tree format without further communication with said server, the document structure questions linked to specific document types representing predetermined contractual provisions, wherein by responding to the document structure questions the user includes predetermined contractual provisions within the assembled document;
receive a response for each document structure question displayed, wherein the document structure responses and the logic imbedded within the selected template determine the document types included within the assembled document;
identify pre-assigned, modifiable input documents from the plurality of input documents compatible with the selected template and the document structure responses for generating the documents to be assembled, the identified input documents including data fill-points;
display transaction questions, wherein the transaction questions displayed are controlled by logic and conditions imbedded in the selected template and the document structure responses;
receive a response for each transaction question displayed, wherein the transaction responses populate the data fill-points included within the identified input documents, the transaction responses checked for validity using the logic imbedded within the selected template and without further communication with said server; and
transmit data identifying the input documents and the transaction responses received to said server for generating the assembled document.

14. A document assembly system in accordance with claim 13 further comprising at least one database coupled to said server, each incomplete assembled document stored in said database.

15. A document assembly system in accordance with claim 14 wherein said database comprises at least one security system that limits access to said database to authorized users.

16. A document assembly system in accordance with claim 13 wherein said server is further configured to communicate with said processor module to restructure and reassemble a previously assembled document.

17. A document assembly system in accordance with claim 13 wherein said server is further configured to communicate with said processor module to restructure and reassemble a previously assembled document by performing at least one of changing parameters within the previously assembled document, and adding new data and insertable documents to the previously assembled document while reusing organizational parameters, insertable documents, and data common to the previously assembled document.

18. A document assembly system in accordance with claim 13 wherein said server is further configured to communicate with said processor module to assemble documents from at least one template stored in said database, each of said template configured to assure compliance with state and federal laws, rules, and regulations, and business entity rules, regulations, and policies.

19. A document assembly system in accordance with claim 13 wherein said server is further configured to communicate with said processor module to integrate pre-approved documents and files from another computer system into said assembled document.

20. A document assembly system in accordance with claim 13 wherein said server is further configured to communicate with said processor module to display at least one of a report and summary including at least one of a user identity who created said document assembly data, a user identity who last modified said document assembly data, and the workflow status of said document assembly.

21. A document assembly system in accordance with claim 13 wherein said server is further configured to communicate with said processor module to display a report including at least one of a summary of all document assembly parameters, a summary of missing and incomplete data, and a summary of missing and corrupted document assembly elements.

22. A document assembly system in accordance with claim 13 wherein said server is further configured to communicate with said processor module to provide secure access to said server such that only authorized users can access said assembled documents data, reports and summaries generated by said system relating to said assembled documents, data links provided within said system, and data stored in at least one database coupled to said server.

23. A document assembly system in accordance with claim 13 wherein said server is further configured to designate at least one question displayed on said remote system as mandatory such that a mandatory question is automatically assigned a response by said server that corresponds to a response entered by a user to a linked antecedent question.

24. A document assembly system in accordance with claim 13 wherein said server is further configured to generate and display the series of questions on said at least one remote computer based on a document assembly structure selected by the user.

25. A document assembly system in accordance with claim 24 wherein said server is further configured to prompt the user to assure that each question within the series of questions is properly responded to prior to data being communicated between said server and said at least one remote computer.

* * * * *